United States Patent
Lee et al.

(10) Patent No.: US 10,430,648 B2
(45) Date of Patent: Oct. 1, 2019

(54) METHOD OF PROCESSING CONTENT AND ELECTRONIC DEVICE USING THE SAME

(71) Applicant: Samsung Electronics Co., Ltd., Gyeonggi-do (KR)

(72) Inventors: Ki-Huk Lee, Gyeonggi-do (KR); Seung-Cheol Lee, Seoul (KR); Jin-Hong Jeong, Gyeonggi-do (KR); Tae-Gun Park, Gyeonggi-do (KR); Sang-Keun Yoo, Gyeonggi-do (KR); Sung-Ho Yoon, Seoul (KR)

(73) Assignee: Samsung Electronics Co., Ltd (KR)

( * ) Notice: Subject to any disclaimer, the term of this patent is extended or adjusted under 35 U.S.C. 154(b) by 192 days.

(21) Appl. No.: 14/687,583

(22) Filed: Apr. 15, 2015

(65) Prior Publication Data
US 2015/0302242 A1    Oct. 22, 2015

(30) Foreign Application Priority Data
Apr. 21, 2014    (KR) .................. 10-2014-0047394

(51) Int. Cl.
G06K 9/00    (2006.01)

(52) U.S. Cl.
CPC ............. G06K 9/00442 (2013.01); G06K 2009/00489 (2013.01)

(58) Field of Classification Search
CPC ..... G06K 9/00442; G06K 2009/00489; G06K 9/18; G06K 9/00; G06K 9/222; G06K 9/48; G06K 9/4604
See application file for complete search history.

(56) References Cited

U.S. PATENT DOCUMENTS

| | | | |
|---|---|---|---|
| 4,741,045 A | | 4/1988 | Denning |
| 4,932,345 A | * | 6/1990 | Takenoya ............... D05B 19/10 112/103 |
| 5,003,614 A | | 3/1991 | Tanaka et al. |
| 5,488,719 A | * | 1/1996 | Kaplan ................ G06K 9/6807 |
| 5,548,700 A | * | 8/1996 | Bagley ................... G06T 11/60 715/255 |

(Continued)

FOREIGN PATENT DOCUMENTS

| | | |
|---|---|---|
| CN | 1324068 | 11/2001 |
| CN | 101103363 | 1/2008 |

(Continued)

OTHER PUBLICATIONS

International Search Report dated Jul. 14, 2015 issued in counterpart application No. PCT/KR2015/003976, 10 pages.

(Continued)

*Primary Examiner* — Samir A Ahmed
(74) *Attorney, Agent, or Firm* — The Farrell Law Firm, P.C.

(57) ABSTRACT

A method for processing content in an electronic device and an electronic device for doing the same are provided. The method includes acquiring content including at least one character, and performing at least one of classifying the acquired content into at least one of a plurality of categories by analyzing the acquired content or generating vector images including a vector image corresponding to the at least one character based on the acquired content and displaying at least a part of the vector images on a display functionally connected to the electronic device.

18 Claims, 24 Drawing Sheets

(56) References Cited

U.S. PATENT DOCUMENTS

| | | | |
|---|---|---|---|
| 5,613,017 A * | 3/1997 | Rao | G06T 3/0012 358/1.11 |
| 5,687,253 A * | 11/1997 | Huttenlocher | G06K 9/6206 382/177 |
| 5,734,761 A | 3/1998 | Bagley | |
| 5,737,443 A * | 4/1998 | Guzik | G06F 3/04883 382/177 |
| 5,751,851 A * | 5/1998 | Guzik | G06K 9/34 382/179 |
| 5,803,629 A * | 9/1998 | Neville | G06F 17/214 400/304 |
| 5,832,531 A * | 11/1998 | Ayers | G06K 9/00463 715/209 |
| 5,991,439 A * | 11/1999 | Tanaka | G06K 9/32 358/402 |
| 6,005,680 A * | 12/1999 | Luther | H04N 1/40062 358/2.1 |
| 6,212,297 B1 * | 4/2001 | Sklarew | G06F 3/033 382/189 |
| 6,332,148 B1 * | 12/2001 | Paine | G06F 17/241 715/236 |
| 6,438,509 B1 * | 8/2002 | Hayama | B41J 3/4075 400/3 |
| 6,681,044 B1 | 1/2004 | Ma et al. | |
| 7,576,753 B2 * | 8/2009 | Saund | G06K 9/00463 345/441 |
| 7,746,343 B1 * | 6/2010 | Charaniya | G06F 3/04815 345/428 |
| 7,751,623 B1 | 7/2010 | Simmons et al. | |
| 2005/0099406 A1 * | 5/2005 | Pettiross | G06F 3/0236 345/179 |
| 2005/0168778 A1 * | 8/2005 | Abe | G06F 17/211 358/1.18 |
| 2005/0281467 A1 | 12/2005 | Stahovich | |
| 2006/0214937 A1 | 9/2006 | Saund et al. | |
| 2006/0271847 A1 * | 11/2006 | Meunier | G06K 9/00469 715/205 |
| 2007/0245229 A1 | 10/2007 | Siedzik et al. | |
| 2007/0280536 A1 | 12/2007 | Zhang et al. | |
| 2009/0021530 A1 | 1/2009 | Ishiguro | |
| 2009/0077053 A1 | 3/2009 | Lallican | |
| 2012/0019487 A1 | 1/2012 | Kazamaki et al. | |
| 2015/0205884 A1 * | 7/2015 | Leventhal | G06F 17/2247 715/234 |

FOREIGN PATENT DOCUMENTS

| | | |
|---|---|---|
| CN | 101350068 | 1/2009 |
| JP | 8-202711 | 8/1996 |
| JP | 9-161089 | 6/1997 |
| JP | 2000-331121 | 11/2000 |
| JP | 2013-182512 | 9/2013 |
| KR | 10-2005-0054713 | 6/2005 |
| KR | 10-2005-0116900 | 12/2005 |
| KR | 10-0656875 | 12/2006 |
| KR | 10-2008-0074470 | 8/2008 |
| KR | 10-2009-0010960 | 1/2009 |
| KR | 10-2009-0024127 | 3/2009 |
| KR | 10-2013-0039637 | 4/2013 |
| WO | WO 2008/132977 | 11/2008 |
| WO | WO 2010/080259 | 7/2010 |

OTHER PUBLICATIONS

European Search Report dated Sep. 2, 2015 issued in counterpart application No. 15164402.8-1901, 6 pages.

Kyung-Won Kang et al., "Utilization of Hierarchical, Stochastic Relationship Modeling for Hangul Character Recognition", IEEE Transactions on Pattern Analysis and Machine Intelligence, vol. 26, No. 9, Sep. 1, 2004, 12 pages.

Norman F. Brickman et al., "Word Autocorrelation Redundancy Match (WARM) Technology", IBM Journal of Research and Development, Nov. 1, 1982, 6 pages.

Hiroshi Nagahashi et al., "A Pattern Description and Generation method of Structural Characters", IEEE Transactions on Pattern Analysis and Machine Intelligence, Vo. 30, No. 1, Jan. 1, 1986, 7 pages.

K.C. Jung et al., "Korean Character Recognition using a TDNN and an HMM", Pattern Recognition Letters, vol. 20, No. 6, Jun. 1, 1999, 13 pages.

European Search Report dated Feb. 2, 2016 issued in counterpart application No. 15164402.8-1901, 17 pages.

European Search Report dated Apr. 25, 2017 issued in counterpart application No. 15164402.8-1901, 6 pages.

"Application Technology of Industrial Configuration Software", Chapter 1, Sep. 30, 2013, 50 pages.

Chinese Office Action dated Jul. 3, 2018 issued in counterpart application No. 201580020740.4, 32 pages.

R.G. Casey, "Moment Normalization of Handprinted Characters", XP-001094531, vol. 14, No. 5, Sep. 1, 1970.

European Search Report dated Apr. 16, 2019 issued in counterpart application No. 15164402.8-1207, 6 pages.

* cited by examiner

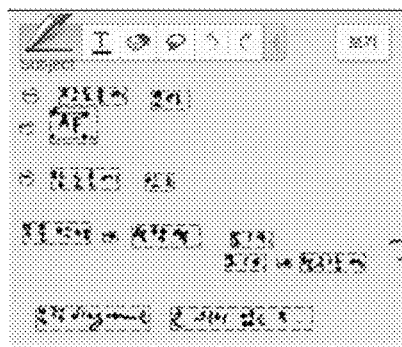 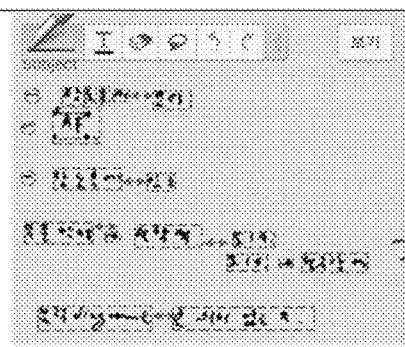
FIG.5A         FIG.5B
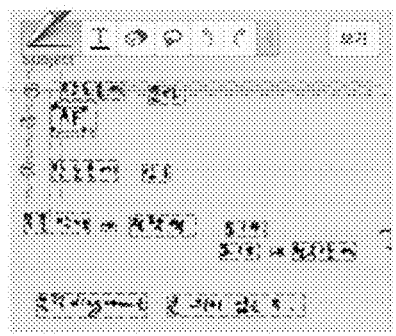
FIG.5C

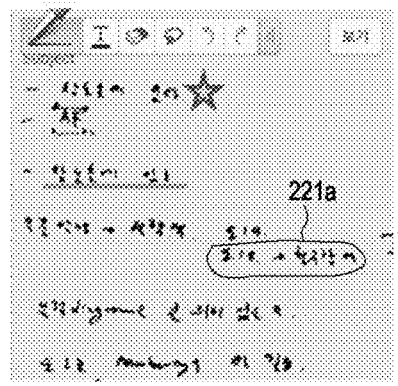 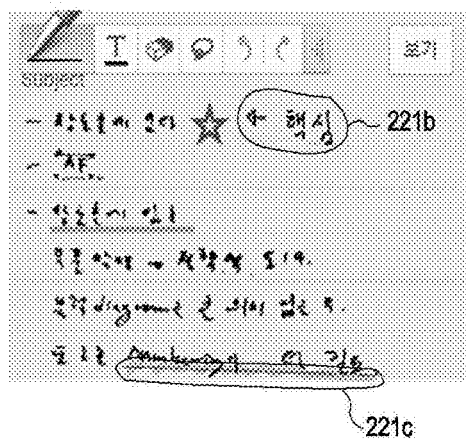
FIG.22A     FIG.22B
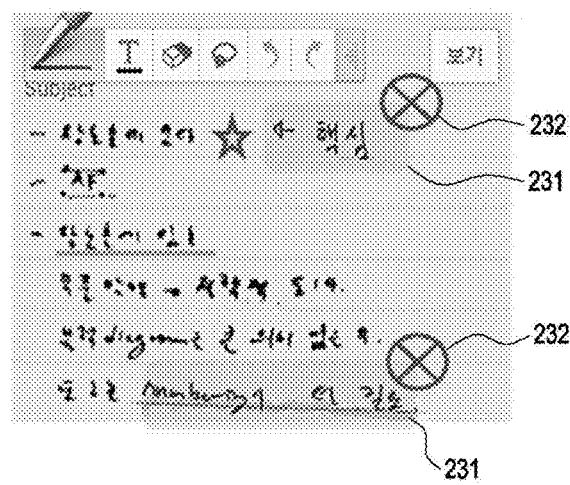
FIG.23

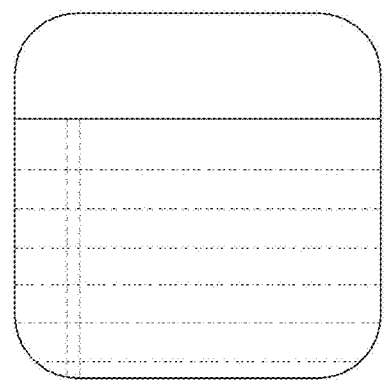
FIG.26A          FIG.26B
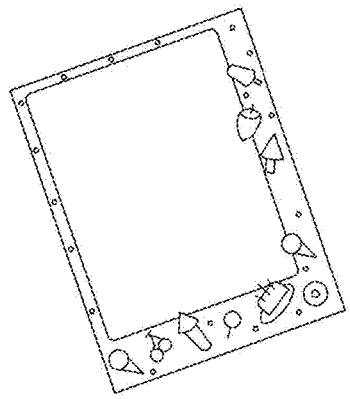
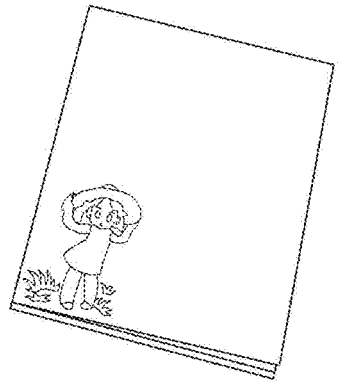
FIG.26C          FIG.26D

METHOD OF PROCESSING CONTENT AND ELECTRONIC DEVICE USING THE SAME

PRIORITY

This application claims priority under 35 U.S.C. § 119(a) to a Korean patent application filed on Apr. 21, 2014 in the Korean Intellectual Property Office and assigned Serial No. 10-2014-0047394, the entire contents of which are incorporated herein by reference.

BACKGROUND

1. Field of the Invention

The present invention relates generally to a content processing method, and more particularly, to a content processing method of acquiring content through an electronic device, analyzing information about the content, and providing the content to a user based on the analysis, and an electronic device using the same.

2. Description of the Related Art

As recent electronic devices such as smartphones, tablet Personal Computers (PCs), and the like are equipped with a display device having a touch panel, a touch screen has become popular, which displays a screen and allows a user to input information by touching the screen. Also, since an electronic device has a camera function, its user can capture a still image or a video irrespective of time and place. Therefore, the user can take a note of necessary information on the electronic device using a touch input means such as an electronic pen, instead of on a paper. The user can also capture an image of specific information and store the image so that the user may view the image when needed.

Due to the development of various image recognition and/or conversion techniques, these techniques are used in conjunction with the above-described functions of the electronic device, thereby facilitating use of information of various images. For example, if a user captures a document using an image sensor of an electronic device, the captured image of the document is converted into text information by an Optical Character Recognition (OCR) function. In this manner, the user may use the captured image as a text image.

Among conventional image recognition techniques, however, a character recognition technique does not offer satisfactory performance to users of electronic devices due to its low accuracy.

Moreover, there is no specified technique for accurately recognizing roughly handwritten characters. Only when a user writes characters similarly to a general font used in an electronic device, such as Gothic, Times New Roman, and the like, are the characters recognized. If the user roughly writes characters, the characters may be illegible and, therefore, unrecognizable.

If handwritten characters are not arranged uniformly according to the handwriting style of the user, the user may have difficulty in understanding the contents of an image of the handwriting acquired by the electronic device.

Conventionally, no technique has been developed for capturing a memo (or note) and storing the captured image by automatically categorizing the image. As a result, the user is inconvenienced by having to classifying necessary images manually.

SUMMARY

The present invention has been made to address at least the above-mentioned problems and/or disadvantages, and to provide at least the advantages described below. Accordingly, an aspect of the present invention is to provide a method processing content in an electronic device, and an electronic device for performing the same.

Another aspect of the present invention is to provide a content processing method for permitting a user of an electronic device to readily edit and use content, and an electronic device using the same.

Another aspect of the present invention is to provide a content processing method for, when a handwritten note is captured or text is written using an input means such as an electronic pen or the like, storing the handwriting as vector images based on content information so that a user may readily edit and use the handwriting. The vector images may be automatically arranged to enable the user to easily view the handwriting.

Another aspect of the present invention is to provide a content processing method for generating various notes as a specific file, for example, categorizing the notes into digital note and storing the notes under the category of digital note, and an electronic device using the same.

Another aspect of the present invention is to provide a content processing method for automatically classifying content acquired by capturing, for example, a document, a note, and the like into a category and storing the content under the category, and an electronic device using the same.

In accordance with an aspect of the present invention, there is provided a method for processing content in an electronic device. The method includes acquiring content including at least one character; generating a plurality of editable images using the acquired content; and displaying the plurality of editable images on a display connected functionally to the electronic device, wherein each of the plurality of editable images includes a different part of the at least one character.

In accordance with another aspect of the present invention, there is provided an electronic device for processing content. The electronic device includes a display; and a controller configured to acquire content including at least one character, generate a plurality of editable images using the acquired content, and display the plurality of editable images on a display connected functionally to the electronic device, wherein each of the plurality of editable image includes a different part of the at least one character.

BRIEF DESCRIPTION OF THE DRAWINGS

The above and other aspects, features and advantages of the present invention will be more apparent from the following description, taken in conjunction with the accompanying drawings, in which:

FIGS. 5A, 5B, and 5C illustrate a result of constructing vector image elements into at least one block according to an embodiment of the present invention;

FIGS. 22A and 22B illustrate a result of editing and arranging the contents of an image according to an embodiment of the present invention;

FIG. 23 illustrates a result of editing and arranging the contents of an image according to an embodiment of the present invention;

FIGS. 26A, 26B, 26C, and 26D illustrate images of various kinds of notes according to an embodiment of the present invention;

DETAILED DESCRIPTION OF EMBODIMENTS OF THE PRESENT INVENTION

Figure 1:
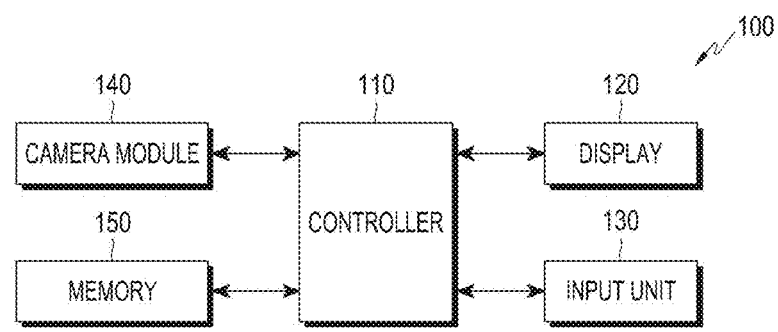
FIG. 1 is a block diagram of an electronic device for processing an image according to an embodiment of the present invention.

The following description with reference to the accompanying drawings is provided to assist in a comprehensive understanding of embodiments of the present invention as defined by the claims and their equivalents. It includes various details to assist in that understanding but these are to be regarded as mere examples. Accordingly, those of ordinary skilled in the art will recognize that various changes and modifications of the embodiments described herein can be made without departing from the scope and spirit of the present invention. Throughout the drawings, like reference numerals will be understood to refer to like parts, components, and structures. In addition, descriptions of well-known functions and constructions are omitted for clarity and conciseness.

The terms and words used in the following description and claims are not limited to their dictionary meanings, but, are merely used to enable a clear and consistent understanding of the present invention. Accordingly, it should be apparent to those skilled in the art that the following description of embodiments of the present invention is provided for illustration purposes only and not for the purpose of limiting the present invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An electronic device according to an embodiment of the present invention may be a device with communication capabilities. For example, an electronic device may be at least one of a smartphone, a tablet Personal Computer (PC), a mobile phone, a video phone, an e-book reader, a desktop PC, a laptop PC, a Netbook computer, a Personal Digital Assistant (PDA), a Portable Multimedia Player (PMP), an Moving Picture Experts Group Audio Layer 3 (MP3) player, mobile medical equipment, a camera, or a wearable device (for example, a Head-Mounted Device (HMD) like electronic glasses, electronic clothing, an electronic bracelet, an electronic necklace, an electronic appcessory, an electronic tattoo, or a smart watch).

According to an embodiment of the present invention, an electronic device may be a smart home appliance having communication capabilities. The smart home appliance may be, for example, at least one of a Television (TV), a Digital Video Disk (DVD) player, an audio player, a refrigerator, an air conditioner, a vacuum cleaner, an oven, a microwave oven, a washer, an air purifier, a set-top box, a TV box (for example, Samsung HomeSync™, Apple TVT™, Google TV™), a game console, an electronic dictionary, an electronic key, a camcorder, or an electronic picture frame.

According to an embodiment of the present invention, an electronic device may be a medical device (for example, a Magnetic Resonance Angiography (MRA) device, a Magnetic Resonance Imaging (MRI) device, a Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (for example, a naval navigation device, a gyroscope, or a compass), an avionic electronic device, a security device, an inn vehicle head unit, an industrial or consumer robot, an Automatic Teller Machine (ATM) for a bank, or a Point of Sales (PoS) device for a shop.

According to an embodiment of the present invention, an electronic device may be furniture, part of a building structure, an electronic board, an electronic signature receiving device, a projector, or various measuring devices (for example, water, electricity, gas or electro-magnetic wave measuring devices), which include communication capabilities. An electronic device according to various embodiments of the present invention may be one or any combination of the foregoing devices. In addition, an electronic device according to various embodiments of the present invention may be a flexible device. It will be apparent to one having ordinary skill in the art that an electronic device according to the present invention is not limited to the foregoing devices.

With reference to the attached drawings, an electronic device according to an embodiment of the present invention will be described below. The term "user" used herein may refer to a person that uses art electronic device or a device (for example, an artificial intelligence electronic device) that uses an electronic device.

Reference will now be made to embodiments of the present invention with reference to the attached drawings. While details such as category, handwriting image, or the like are given in the following description, it is to be clearly understood by those skilled in the art that the details are provided to help comprehensive understanding of the present invention and thus many modifications and changes can be made to them within the scope and spirit of the present invention.

FIG. 1 is a block diagram of an electronic device 100 for processing an image according to an embodiment of the present invention.

Referring to FIG. 1, an electronic device 100 includes a controller 110, a display 120, an input unit 130, a camera module 140, and a memory 150. The following description is given with the appreciation that the display 120 is a touch screen, by way of example.

The display 120 (for example, a touch screen) receives a user manipulation and displays an execution image, operation state, and menu state of an application program. The display 120 may provide a user with User Interfaces (Ins) corresponding to various services (for example, call, data transmission, broadcasting, photo shot, and the like). The display 120 transmits an analog signal corresponding to at least one touch input to a UI to a touch screen controller (not shown). The display 120 receives at least one of a hand touch input or a touch input of a touch input means such as a stylus pen (hereinafter, referred to as an electronic pen). Also, the display 120 may receive a continuous movement of one touch among at least one touch. The display 120 transmits an analog signal corresponding to a continuous movement of the touch to the touch screen controller.

According to an embodiment of the present invention, the display 120 may be implemented as, for example, a resistive type, a capacitive type, an Electro-Magnetic Resonance (EMR) type, an infrared type, or an acoustic wave type.

According to an embodiment of the present invention, a touch may include a non-contact touch, not limited to a hand touch or a touch of an electronic pen on the display 120. A gap above which a non contact touch is detectable in the display 120 may vary depending on the capabilities or structure of the electronic device 100. For example, to distinguish a touch event generated by contact between the display 120 and a hand or an electronic pen from a non-contact input event (for example, a hovering event), the display 120 outputs different detection values (for example, different current values or the like) for the touch event and the hovering event. Furthermore, the display 120 outputs a different detection value (for example, a different current value or the like) according to the distance between an area of a hovering event and the display 120.

According to an embodiment of the present invention, the touch screen controller converts an analog signal received from the display 120 to a digital signal (for example, X and Y coordinates) and transmits the digital signal to the controller 110. The controller 110 controls the display 120 using the received digital signal. For example, the controller 110 may execute a shortcut icon (not shown) displayed on the display 120 in response to a touch event or a hovering event. According to an embodiment of the present invention, a touch screen controller is incorporated into the controller 110.

According to an embodiment of the present invention, the touch screen controller determines the distance between a space in which a hovering event occurs and the display 120 by detecting a value (for example, a current value or the like) output from the display 120, converts the distance to a digital signal (for example, a Z coordinate), and provides the digital signal to the controller 110.

According to an embodiment of the present invention, to receive a hand touch input and a touch input of an electronic pen simultaneously, the display 120 includes at least two touch screen panels that sense touches or proximity of the user's hand and the electronic pen, respectively. The at least two touch screen panels provide different output values to the touch screen controller, and the touch screen controller determines whether an input from the display 120 is an input of the user's hand or an input of the electronic pen by distinguishing values received from the at least two touch screen panels.

The input unit 130 receives a user manipulation and includes at least one of buttons, a keypad, or a microphone. According to an embodiment of the present invention, the buttons may be formed on the front surface, a side surface, or the rear surface of a housing of the electronic device 100, and may include at least one of a power/lock button or a menu button.

According to an embodiment of the present invention, a keypad receives a key input from the user to control the electronic device 100. The keypad may include a physical keypad formed in the electronic device 100. According to an embodiment of the present invention, the physical keypad may not be provided according to the capabilities or structure of the electronic device 100. According to an embodiment of the present invention, the microphone receives a voice or a sound and converts the received voice or sound to an electrical signal under the control of the controller 110.

The camera module 140 includes at least one of a first camera or a second camera. The camera module 140 executes functions of a general digital camera, including capturing a still image or a video, under the control of the controller 110. The camera module 140 captures an image through an image sensor included in the first or second camera by activating the first or second camera.

The memory 150 stores input/output signals or data in accordance with operations of the display 120, the input unit 130, and the camera module 140 under the control of the controller 110. The memory 150 may store a control program for controlling the electronic device 100 or the controller 110, applications, or content.

According to an embodiment of the present invention, the term "memory" includes the memory 150, a Read Only Memory (ROM) and a Random Access Memory (RAM) within the controller 110, or a memory card (for example, a Secure Digital (SD) card, a memory stick, or the like) mounted to the electronic device 100. The memory 150 may include a nonvolatile memory, a volatile memory, a Hard Disk Drive (HDD), or a Solid State Drive (SSD).

The controller 110 includes a Central Processing Unit (CPU; not shown), a ROM for storing a control program to control the electronic device 100, and a RAM for storing signals or data received from the outside of the electronic device 100 or for use as a memory space for an operation performed by the electronic device 100. The CPU may include one or more cores. The CPU, the ROM, and the RAM are interconnected through an internal bus (not shown).

The controller 110 controls at least one of the display 120, the input unit 130, the camera module 140, or the memory 150 in functional connection to the at least one of the display 120, the input unit 130, the camera module 140, or the memory 150.

According to an embodiment of the present invention, upon acquisition of content including at least one character, the controller 110 controls at least one of classifying the acquired content into one of a plurality of categories by analyzing the acquired content or generating vector images including a vector image corresponding to the at least one character from the acquired content and displaying at least a part of the vector images on the display 120. According to an embodiment of the present invention, the controller 110 may be implemented as a hardware module (for example, a processor), a software module (for example, an application), or a combination of them.

The content may be an image acquired by capturing a specific object through the camera module 140 functionally connected to the controller 110. According to an embodiment of the present invention, the content is an image captured by executing a screen capturing function among functions of the electronic device 100. According to an embodiment of the present invention, the content is text input to the display 120 by an input means such as an electronic pen in a handwriting input application such as a digital note or the like. According to an embodiment of the present invention, the content may be received from an external electronic device, for example, a file in various formats such as Joint Photographic Experts Group (JPG), Graphics Interchange Format (GIF), Bitmap (BMP), or the like.

A detailed description is given of image processing according to embodiments of the present invention, in the context of an image captured through the camera module 140 as content.

Figure 2:
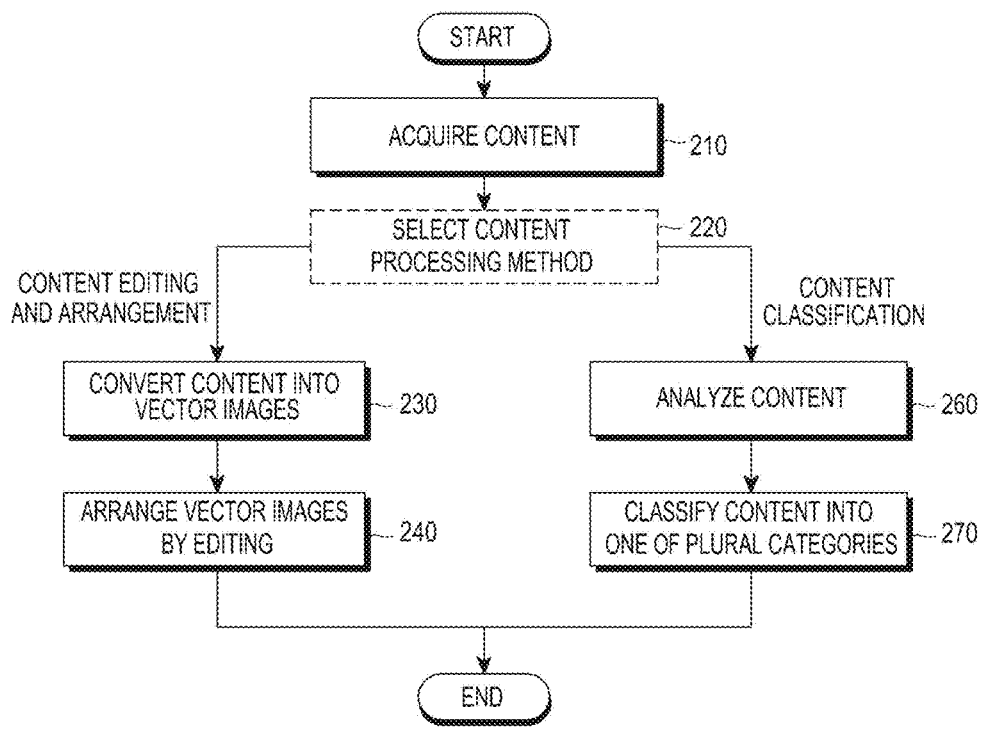
FIG. 2 is a flowchart illustrating a method of image processing according to an embodiment of the present invention.

FIG. 2 is a flowchart illustrating a method of processing content (for example, an image) according to an embodiment of the present invention. In FIG. 2, the content processing method includes at least one of a method of editing and arranging the content or a method of classifying content. According to an embodiment of the present invention, vector images are generated from content acquired through an electronic device 100 and provided to a user so that the user may readily recognize and edit the content. According to an embodiment of the present invention, content acquired in an electronic device 100 are automatically classified into a category and stored under the category.

Figure 3A:
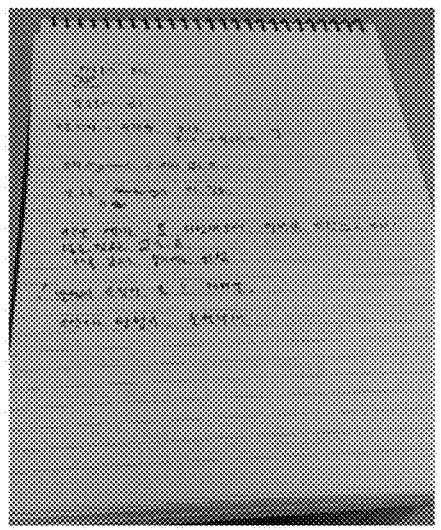
FIGS. 3A, 3B, 3C, and 3D illustrate acquiring an image and converting the acquired image to vector images according to an embodiment of the present invention.

Referring to FIG. 2, the electronic device 100 (for example, the controller 110) acquires content according to a user manipulation in operation 210. For example, the electronic device 100 may acquire content (for example, a handwritten note) illustrated in FIG. 3A through a camera (for example, the camera module 140).

According to an embodiment of the present invention, the electronic device 100 selects a content processing method for the acquired content in operation 220. For example, the content processing method may be content editing and arrangement or content classification. If content editing and arrangement is selected as the content processing method in operation 220, the electronic device 100 proceeds to operation 230. If content classification is selected as the content processing method in operation 220, the electronic device 100 proceeds to operation 260. According to an embodiment of the present invention, the electronic device 100 may not perform operation 220 but, instead, may perform operation 230 and operation 260 sequentially or simultaneously.

Figure 3B:
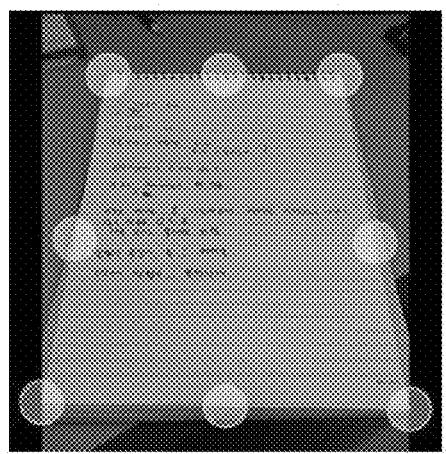
Figure 3C:
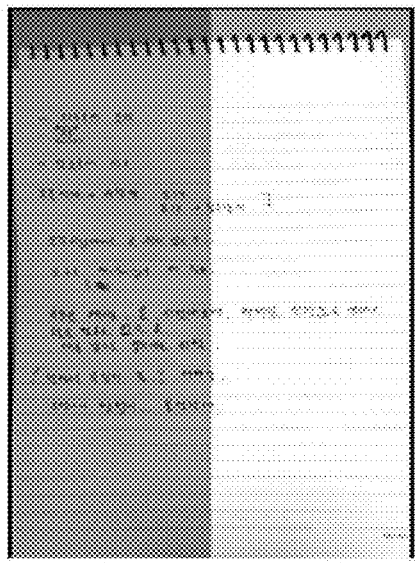
Figure 3D:
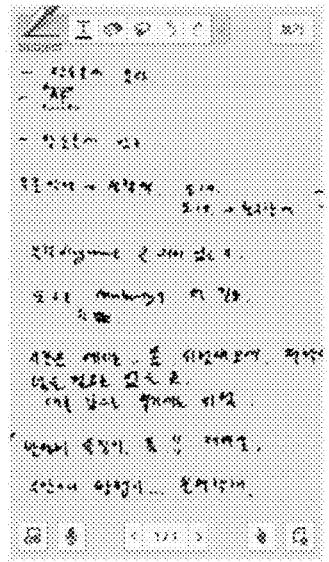

Upon selection of content editing and arrangement in operation 220, the electronic device 100 converts the content to vector images in operation 230. According to an embodiment of the present invention, the vector images are created from the content so that information about the content may be stored in the form of shapes and lines. For example, a vector file (or a vector image file) is created by pre-processing the content acquired by the electronic device 100 by Optical Character Recognition (OCR) and generating vector images from the pre-processed content. The OCR-based pre-processing may include removal of unnecessary information from strokes or characters included in the content and processing of the content to facilitate recognition. According to an embodiment of the present invention, the electronic device 100 performs perspective correction on, for example, captured content in order to convert the content into vector images. The electronic device 100 converts content illustrated in FIG. 3B to content illustrated in FIG. 3C by perspective correction. Subsequently, the electronic device 100 generates vector images from the perspective-corrected content, thus creating a vector image file. According to operation 230, the electronic device 100 displays the vector images of the vector image file on a screen by executing an application, as illustrated in FIG. 3D.

In operation 240, the electronic device 100 arranges the vector images by editing them. The vector images may include various types of images such as dots, lines, curves, polygons, and the like generated from the content. According to an embodiment of the present invention, the vector images are constructed into at least one block and then arranged by editing the vector images of the at least one block in operation 240. The vector images are edited and arranged by adjusting at least one of the sizes of the vector images in the at least one block, intervals between the vector images in each block, intervals between blocks, or rotation degrees of vector images in each block.

According to an embodiment of the present invention, the vector images are edited and arranged by adjusting at least one of the sizes, intervals, or rotation degrees of the vector images generated by the electronic device 100 in operation 240.

Operation 240 for arranging the vector images by editing them is described below in greater detail with reference to FIGS. 4 to 24.

Upon selection of content classification in operation 220, the electronic device 100 analyzes the acquired content in operation 260. The electronic device 100 analyzes an attribute of the acquired content and/or determines information related to the acquired content.

In operation 270, the electronic device 100 classifies the content into one of a plurality of predetermined categories according to a predetermined criterion (or condition). The electronic device 100 classifies the content into one of the plurality of predetermined categories and stores the content under the category. The plurality of categories may be preset during fabrication of the electronic device 100 or may be set by the user. The user may change the categories by deletion, insertion, or the like.

Operation 260 and operation 270 for analyzing and classifying content are described below in greater detail with reference to FIGS. 25 to 30B.

Figure 4:
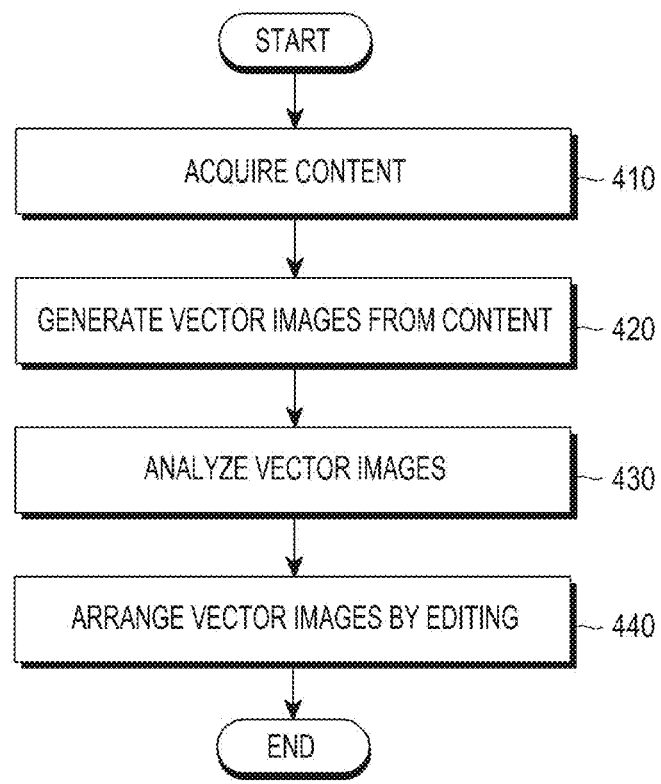
FIG. 4 is a flowchart illustrating a method of editing and arranging the contents of an image according to an embodiment of the present invention.

FIG. 4 is a flowchart illustrating a method of editing and arranging content (for example, an image) according to an embodiment of the present invention. In FIG. 4, image elements (for example, strokes, characters, and the like) included in acquired content (for example, a handwriting image, a note, or the like) are constructed into at least one block, edited on a block basis, and then rearranged accordingly. The image elements may be arranged by adjusting at least one of the sizes of image elements in the at least one block, intervals between the at least one block, intervals between image elements in each of the at least one block, or rotation degrees of the image elements in each of the at least one block.

Referring to FIG. 4, the electronic device 100 acquires content (for example, a handwriting image or a note) according to a user manipulation in operation 410 and generates vector images from the content in operation 420.

In operation 430, the electronic device 100 analyzes the vector images. The electronic device 100 constructs the vector images into at least one block and analyzes the at least one block of the vector images. The electronic device 100 may group adjacent vector images into one block (for example, if a set of adjacent vector images form one character, word, or sentence, the character, word, or sentence is constructed into one block) or may construct each vector image into one block based on at least one of the sizes of the vector images or intervals between the vector images.

According to an embodiment of the present invention, each block may include one vector image of one starting symbol in operation 430, as illustrated in FIG. 5A. Referring to FIG. 5A, each block may include a plurality of vector images, such as a block of one word or a block of a plurality of words.

According to an embodiment of the present invention, intervals between vector images generated by the electronic device 100 are determined and then vector images having intervals within a predetermined range are grouped into one block.

According to an embodiment of the present invention, the electronic device 100 determines intervals between generated vector images and/or the sizes of the vector images (for example, heights, widths, height and width ratios, or the like of the vector images) and constructs vector images having intervals and/or sizes within a predetermined range into one block. The electronic device 100 groups vector images having size and interval ratios within to predetermined range into a block.

According to an embodiment of the present invention, if symbols are pre-stored in a table, the electronic device 100 constructs each vector image element or a plurality of vector images into one block by comparing the vector image element or the vector images with the shapes of the symbols.

Vector images may be constructed into blocks on a character basis or on a smaller unit basis. For the Korean alphabet, vector images may be constructed into blocks on a constant or vowel basis, or on a character, word, or sentence basis, as illustrated in FIG. 5B. For the English alphabet, vector images may be constructed into blocks on a letter, word, or sentence basis.

Referring to FIG. 5C, the electronic device 100 analyzes vector images constructed into blocks according to an embodiment of the present invention. The electronic device 100 analyzes a relationship among the vector images in the blocks based on various criteria including the widths, heights, width-to-height ratios, horizontal center lines, vertical center lines, horizontal outlines, vertical outlines, intervals, rotation degrees, or center points of the vector images in the blocks. The electronic device 100 may analyze a relationship among the vector images in the blocks by analyzing difference, average, distribution, lowest value, highest value, or similarity in at least one of the widths, heights, width-to-height ratios, horizontal center lines, vertical center lines, horizontal outlines, vertical outlines, intervals, rotation degrees, or center points of the vector images in the blocks.

In operation 440, in FIG. 4, the electronic device 100 arranges the vector images by editing them. The electronic device 100 arranges the vector images by adjusting at least one of the sizes (for example, widths or heights) of the vector images in the blocks, intervals between the blocks, or the rotation degrees of vector images in each block.

Operation 440 for editing and arranging vector images by adjusting the sizes of the vector images constructed into blocks is further described with reference to FIG. 6.

Figure 6:
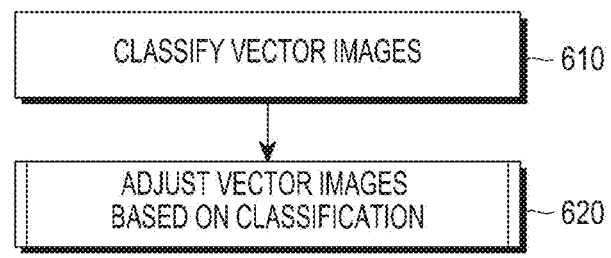
FIG. 6 is a flowchart illustrating a method of arranging vector image elements constructed into blocks by adjusting the sizes of the vector image elements according to an embodiment of the present invention.

Referring to FIG. 6, the electronic device 100 (for example, the controller 110) classifies vector images in operation 610. According to an embodiment of the present invention, the electronic device 100 classifies the types of vector images constructed into blocks. The electronic device 100 classifies the types of the blocks based on at least one of the positions of the blocks, information about the surroundings of the blocks (for example, the types of adjacent vector images), or the shapes of vector images included in the blocks.

A starting symbol is generally disposed at the start of a paragraph, whereas a symbol like an exclamation point is generally disposed at the end of a paragraph. Therefore, the electronic device 100 may classify the types of blocks using information about the positions of the blocks. In addition, there is no other block (that is, no other vector image) to the left of a starting symbol, while a vector image of another starting symbol may be located above or under the starting symbol, and a vector image corresponding to a character or contents may be located to the right of the starting symbol. Accordingly, the electronic device 100 may classify the type of a block based on information about the surroundings of the block. If a block includes a starting symbol, the electronic device 100 classifies the type of the block by comparing the starting symbol with frequently used symbols pre-stored in a table. If a block includes a handwritten character, the electronic device 100 determines the type of the block by comparing the handwritten character with general shapes of handwritten characters pre-stored in a table.

The electronic device 100 classifies the type of a block into various categories such as character, figure, drawing, symbol, or the like based on the above-described classification methods.

In operation 620, the electronic device 100 adjusts the sizes of the vector images according to the forgoing classification. The vector images are the vector images constructed into blocks in operation 610.

In an embodiment of the present invention. Operation 620 for adjusting the sizes of vector images constructed into blocks is described below with reference to FIG. 7.

Figure 7:
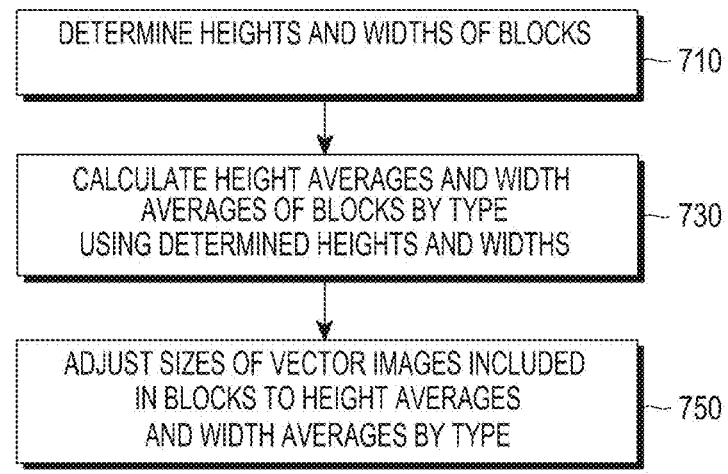
FIG. 7 is a flowchart illustrating a method of arranging vector image elements constructed into blocks by adjusting the sizes of the vector image elements illustrated in FIG. 6 according to an embodiment of the present invention.

In FIG. 7, the electronic device 100 adjusts the sizes of vector images included in blocks according to the averages of the heights and widths of the blocks calculated for the respective types of the blocks.

Referring to FIG. 7, the electronic device 100 determines the height ft and width w of each block in operation 710.

In operation 730, the electronic device 100 calculates a height average and a width average for blocks by type. If the blocks are classified into character and symbol, the electronic device 100 calculates the averages of the heights and widths of character blocks and the averages of the heights and widths of symbol blocks, respectively.

The electronic device 100 adjusts the sizes of the vector images included in the blocks to the calculated averages corresponding to the types of the blocks in operation 750. The electronic device 100 adjusts the heights and widths of the vector images included in the character blocks to the average height and average width calculated for the character type. Also, the electronic device 100 adjusts the heights and widths of the vector images included in the symbol blocks to the average height and average width calculated for the symbol type.

The electronic device 100 may, instead, determine the heights or widths of blocks and adjust the sizes of vector images included in the blocks to averages of the heights or widths of the blocks calculated by block type.

Figure 8:
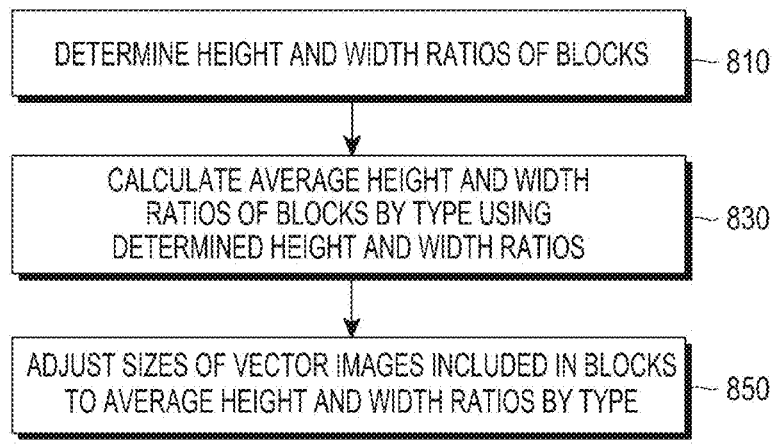
FIG. 8 is a flowchart illustrating a method of arranging vector image elements constructed into blocks by adjusting the sizes of the vector image elements illustrated in FIG. 6 according to an embodiment of the present invention.

With reference to FIG. 8, in an embodiment of the present invention, operation 620 for adjusting the sizes of vector images constructed into blocks is described in detail. In FIG. 8, the sizes of vector is in blocks of each type are adjusted to the average of the height-and-width ratios of the blocks of the type in the operation for adjusting the sizes of vector images constructed into blocks.

Referring to FIG. 8, the electronic device 100 determines the height-and-width ratio of each block in operation 810.

In operation 830, the electronic device 100 calculates the averages of the height-and-width ratios of the blocks by type.

The electronic device 100 adjusts the sizes of the vector images included in the blocks to the average height-and-width ratios calculated by type, according to the types of the blocks in operation 850. The electronic device 100 adjusts the sizes of vector images included in blocks of each type to the average height-and-width ratio (average h/w) calculated for the type.

In an embodiment of the present invention, the electronic device 100 uses a predetermined guide line (for example, a manuscript line). The electronic device 100 adjusts the sizes of vector images included in blocks according to the size of a predetermined guide line (for example, at least one of the height or width of a guide line). A height may be preset for each block type and the electronic device 100 may adjust the heights of the vector images included in the blocks according to the heights preset for the types of the blocks.

A method of arranging vector images by adjusting intervals between the vector images for arranging vector images by editing them, is described in detail with reference to FIG. 9.

Figure 9:
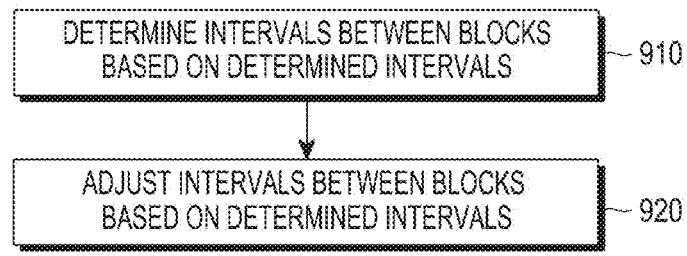
FIG. 9 is a flowchart illustrating a method of arranging blocks by adjusting intervals between the blocks according to an embodiment of the present invention.

Referring to FIG. 9, the electronic device 100 determines intervals between a block and its adjacent blocks in operation 910. For a given block, the electronic device 100 determines the intervals between the block and upward, downward, left, and right adjacent blocks.

Figure 10:
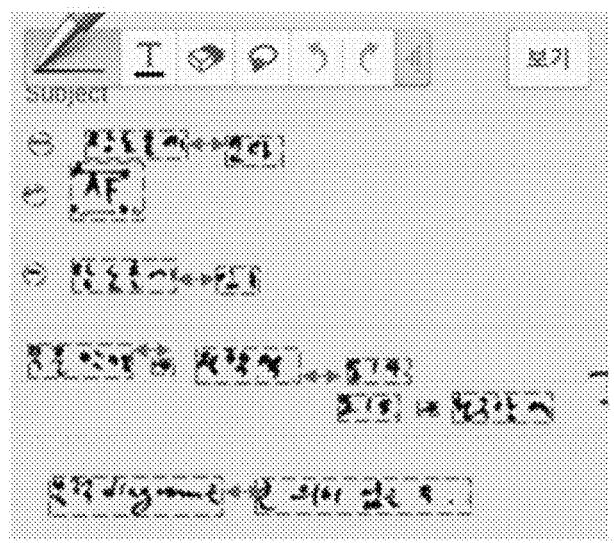
FIG. 10 illustrates a result of arranging blocks by adjusting intervals between the blocks according to an embodiment of the present invention.

In operation 920, the electronic device 100 adjusts the intervals between the blocks using the intervals determined in operation 910. The electronic device 100 determines intervals between a block and its left and right adjacent blocks among blocks of vector images, as illustrated in FIG. 10.

A method of arranging vector images by adjusting intervals between vector images on a block basis for arranging vector images by editing them, is described in detail with reference to FIG. 11.

Figure 11:
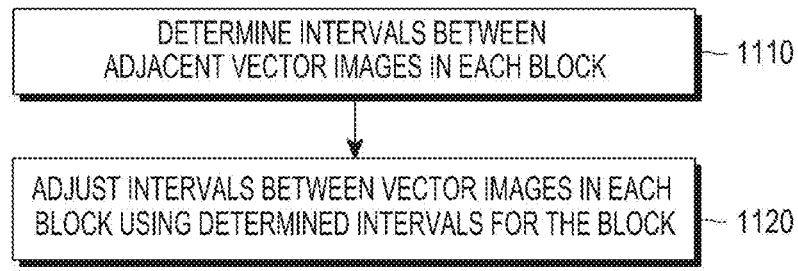
FIG. 11 is a flowchart illustrating a method of arranging vector images by adjusting intervals between vector images on a block basis according to an embodiment of the present invention.

Referring to FIG. 11, the electronic device 100 determines intervals between a vector image and its adjacent vector images included in each block in operation 1110. For a given vector image included in a block, the electronic device 100 determines the intervals between the vector image and its upward, downward, left, and right adjacent images in the same block.

In operation 1120, the electronic device 100 adjusts the intervals between vector images in each block, using the determined intervals. If adjacent text images included in a text block are apart from each other by 4 mm on average, the electronic device 100 uniformly adjusts the intervals between the text images in the text block to 4 mm.

A method of arranging vector images by adjusting rotation degrees of vector images on a block basis for arranging vector images by editing them, is described in detail with reference to FIG. 12.

Figure 12:
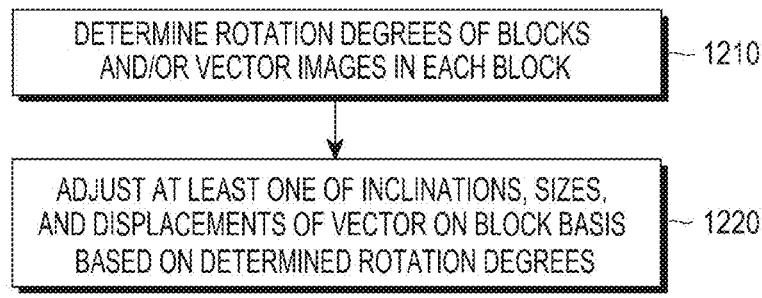
FIG. 12 is a flowchart illustrating a method of arranging vector image elements by adjusting rotation degrees of vector image elements on a block basis according to an embodiment of the present invention.

Referring to FIG. 12, the electronic device 100 determines rotation degrees of blocks and/or rotation degrees of vector images in each block in operation 1210. The electronic device 100 determines the rotation degrees of blocks and/or the rotation degrees of vector images in each block, with respect to predetermined X and Y axes. In another example, the electronic device 100 determines the rotation degrees of blocks and/or the rotation degrees of vector images in each block, based on the inclination of a virtual line connecting the tops of top vector images of characters in the block and the inclination of a virtual line connecting the bottoms of bottom vector images of the characters in the block.

Figure 13:
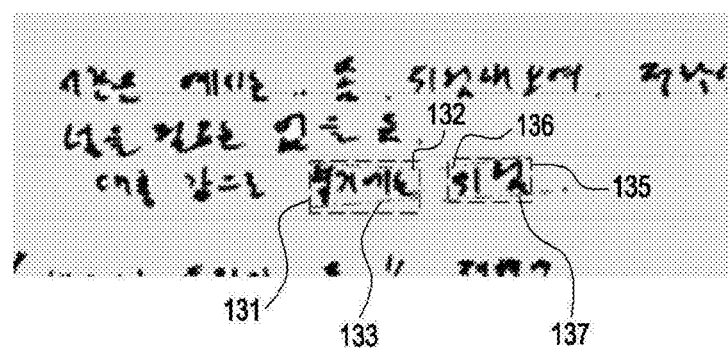
FIG. 13 illustrates a result of arranging vector image elements by adjusting rotation degrees of vector image elements on a block basis according to an embodiment of the present invention.

In operation 1220, the electronic device 100 adjusts vector images in each block in terms of at least one of inclination, size, and displacement, according to the determined rotation degrees. Referring to FIG. 13, it may be noted from a text block 135 "위형" that the characters "위형" are inclined (rotated) on the whole, judging from the inclinations of a line 136 connecting top vector images of the characters and a line 137 connecting bottom vector images of the characters. Accordingly, the electronic device 100 adjusts the inclination of the characters "위형". The electronic device 100 adjusts the sizes of "위" and "형" to the same value or similar values, or the electronic device 100 adjusts the rotation degree of the whole text block 135 by adjusting the position of "위" or "형", specifically moving "위" upward.

Various embodiments of operation 440 for arranging vector images by editing them may be combined. For example, the operation of arranging vector images constructed into blocks by adjusting the sizes of the vector images and the operation of arranging vector images by adjusting the rotation degrees of the vector images on a block basis may be performed in combination.

Referring to FIG. 13, it may be determined regarding a text block 131 "냉기에는" that the characters are tapered toward the end of the text block 131, based on the inclinations of a line 132 connecting top vector images of the characters and a line 133 connecting bottom vector images of the characters. In this case, the electronic device 100 adjusts the sizes of the characters "냉기에는" in the text block 131 to a uniform size. The electronic device 100 may increase the size(s) of a vector image(s) corresponding to "는" or decrease the size(s) of a vector image(s) corresponding to "냉".

Figures 14A, 14B:
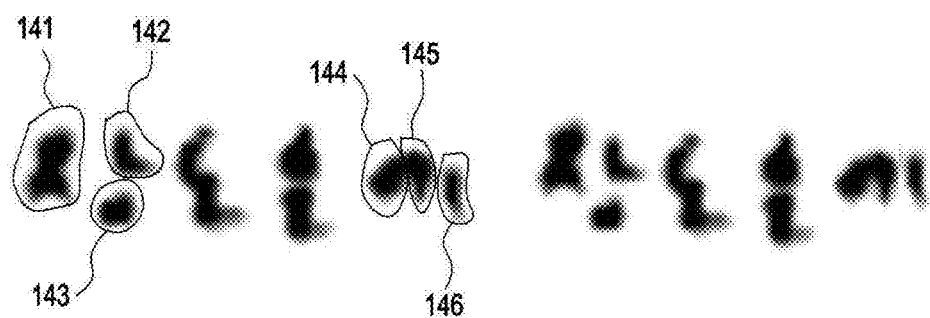
FIGS. 14A and 14B illustrate a result of arranging vector image elements constructed into blocks by editing vector image elements according to an embodiment of the present invention.

According to a combination of various embodiments of operation 440 for arranging vector images by editing them, for example, if each stroke of a character is represented as a vector image, the intervals between vector images may be the intervals between strokes. In this case, the electronic device 100 may arrange vector images constructed into blocks by adjusting the intervals between the strokes based on information about the intervals between the strokes. Referring to FIGS. 14A and 14B, the electronic device 100 adjusts intervals among strokes ㅈ 141, ㅏ 142, and ㅇ 143 in a character "장", or the heights, sizes, or rotation degrees of the strokes ㅈ 141, ㅏ 142, and 이 더 필요 143 in the character "장". Furthermore, the electronic device 100 may adjust intervals among strokes 이 더 필요 144, ㅏ 145, and l146 in a character "어", or the heights, sizes, or rotation degrees of the strokes 이 더 필요 144, ㅏ 145, and l146 in the character "어".

Figure 15:
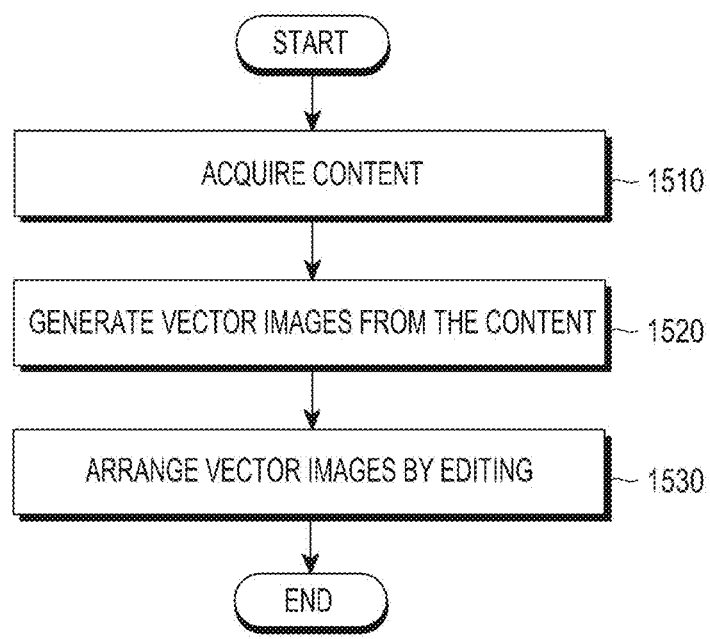
FIG. 15 is a flowchart illustrating a method of editing and arranging the contents of an image according to an embodiment of the present invention.

FIG. 15 is a flowchart illustrating a method of editing and arranging the contents of content (for example, an image) according to an embodiment of the present invention. In FIG. 15, image elements (for example, strokes, characters, or the like) included in content may be edited and then rearranged in the operation for editing and arranging the contents of content. Content may be arranged by adjusting at least one of the sizes, intervals, or rotation degrees of image elements included in an acquired handwriting image.

Referring to FIG. 15, the electronic device 100 acquires content in operation 1510 and generates vector images from the content in operation 1520.

In operation 1530, the electronic device 100 arranges the generated vector images by editing them. The electronic device 100 may edit and arrange the vector images by adjusting at least one of the sizes, intervals, or rotation degrees of the generated vector images.

In the case of size adjustment in operation 1530, the electronic device 100 may adjust the sizes of the vector images differently according to the types of the vector images. The electronic device 100 may adjust the sizes of character vector images and figure vector images differently. Furthermore, the electronic device 100 adjusts the character vector images to similar sizes and ratios based on the sizes and ratios of the character vector images and adjusts the figure vector images to similar sizes and ratios based on the sizes and ratios of the character vector images. Furthermore, the electronic device 100 may adjust the size and ratio of a figure vector image based on an adjustment ratio of a character vector image, taking into account the size of the character vector image that is included in the figure vector image or that modifies the figure vector image. If a figure vector image is different from a character vector image within a predetermined range (for example, if the figure vector image is larger than the character vector image by 1.2 times or less), the electronic device 100 adjusts the size of the figure vector image to a similar size of the character vector image. If the figure vector image is different from the character vector image beyond the predetermined range (for example, if the figure vector image is larger than the character vector image by 1.2 times or more), the electronic device 100 adjusts the size of the figure vector image to be proportional to an integer multiple of the size of the character vector image (for example, a size similar to double, triple, or quadruple the size of the character vector image). If the figure vector image is larger than the character vector image by about 1.5 times, the electronic device 100 adjusts the size of the figure vector image to about double the size of the character vector image. If the figure vector image is larger than the character vector image by about 1.2 times, the electronic device 100 adjusts the size of the figure vector image to about the size of the character vector image.

In the operation for adjusting the sizes of vector images in operation 1530 for arranging generated vector images by editing them, the electronic device 100 determines the types of the vector images and adjusts the sizes of the vector images according to the types.

The types of the vector images may be determined using at least one of positions, surroundings (information about vector images adjacent to the vector images), or shapes of the vector images in the same manner as the types of blocks are determined as described above. Various types may be defined for the vector images, inclusive of character, figure, drawing, symbol, and the like.

The sizes of the vector images may be adjusted according to the types of the vector images. In the present invention, the electronic device 100 may calculate at least one of the average of the heights of the vector images or the average of the widths of the vector images by type and adjust the sizes of the vector images to the averages calculated for their types. For example, if there are text vector elements having heights of 10 mm, 8 mm, and 6 mm, respectively, the electronic device 100 may adjust all of the text vector images to the height of 8 mm.

The electronic device 100 may calculate the average of height-and-width ratios (for example, height-to-width ratios) of vector images by type and adjust the sizes of the vector images to the average height-and-width ratios calculated for their types.

The electronic device 100 may adjust the sizes of vector images by type according to predetermined guide line sizes. For example, if a height is preset for vector images of each type, the electronic device 100 may adjust the heights of the vector images to the preset heights according to the types of the vector images. For example, if there is a guide line in a background image and a guide line size for text vector images is 12 mm, the electronic device 100 may adjust the sizes of the text vector images to about 9 mm.

In operation 1530 for arranging vector images by editing them, the electronic device 100 may adjust vector images of different types to different intervals. The electronic device 100 may adjust vector images of the same type such that they may be arranged at the same interval. Furthermore, the electronic device 100 may adjust vector images of different types such that they may be arranged at different intervals. For example, if each stroke of a character forms a vector image, the electronic device 100 may analyze intervals between strokes and adjust the intervals between the strokes based on the analyzed intervals.

In operation 1530 for arranging vector images by editing them, the electronic device 100 may adjust intervals between vector images using intervals between vector images and their adjacent vector images, intervals between vector images and their adjacent vector images by type, or predetermined intervals between vector images by type.

In operation 1530 for arranging vector images by editing them, the electronic device 100 may adjust at least one of the inclinations, sizes, and displacements of vector images according to rotation degrees of the vector images in a similar manner to adjustment of rotation degrees of vector images on a block basis, as described above.

Figure 16A:
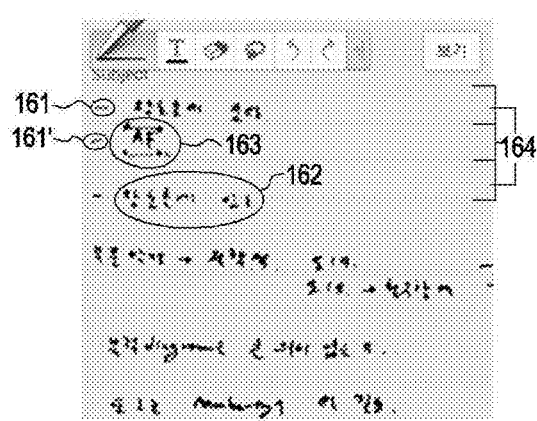
FIGS. 16A and 16B illustrate a result of editing and arranging the contents of an image according to an embodiment of the present invention.
Figure 16B:

The operation for generating vector images from acquired content (for example, a handwriting image) and rearranging the vector images by editing them as described above may result in, for example, an image illustrated in FIG. 16B. FIG. 16A illustrates an image prior to editing and arrangement of vector images and FIG. 16B illustrates an image achieved by editing and arranging the vector images. From FIGS. 16A and 16B, it is noted that the vector images, for example, characters, are arranged uniformly after editing of the vector images.

Referring to FIGS. 16A and 16B, starting symbols 161 and 161' are arranged and the following paragraphs are also arranged, according to the type of the starting symbols 161 and 161'. For example, the interval between the starting symbol 161 and a phrase 162 "정노출에 있다" is equal to the interval between the starting symbol 161' and a word 163 "AF". Also, the height and character size of the phrase 162 "장노출에 있다" are adjusted. The size of the word 163 "AF" is also adjusted. Specifically, the size of the word 163 "AF" may be adjusted based on the size of a character vector image included in a figure vector image. Or since the size of the figure vector image is larger than that of the character vector image by a predetermined multiple times (about 1.2 times) or less, the word 163 "AF" may be adjusted to about the size of the character vector image. It is noted that the position of each paragraph is corrected to match to predetermined guide lines 164, for example, manuscript lines (of the electronic device 100 or a captured image). Furthermore, the intervals between words are adjusted.

Figure 17:
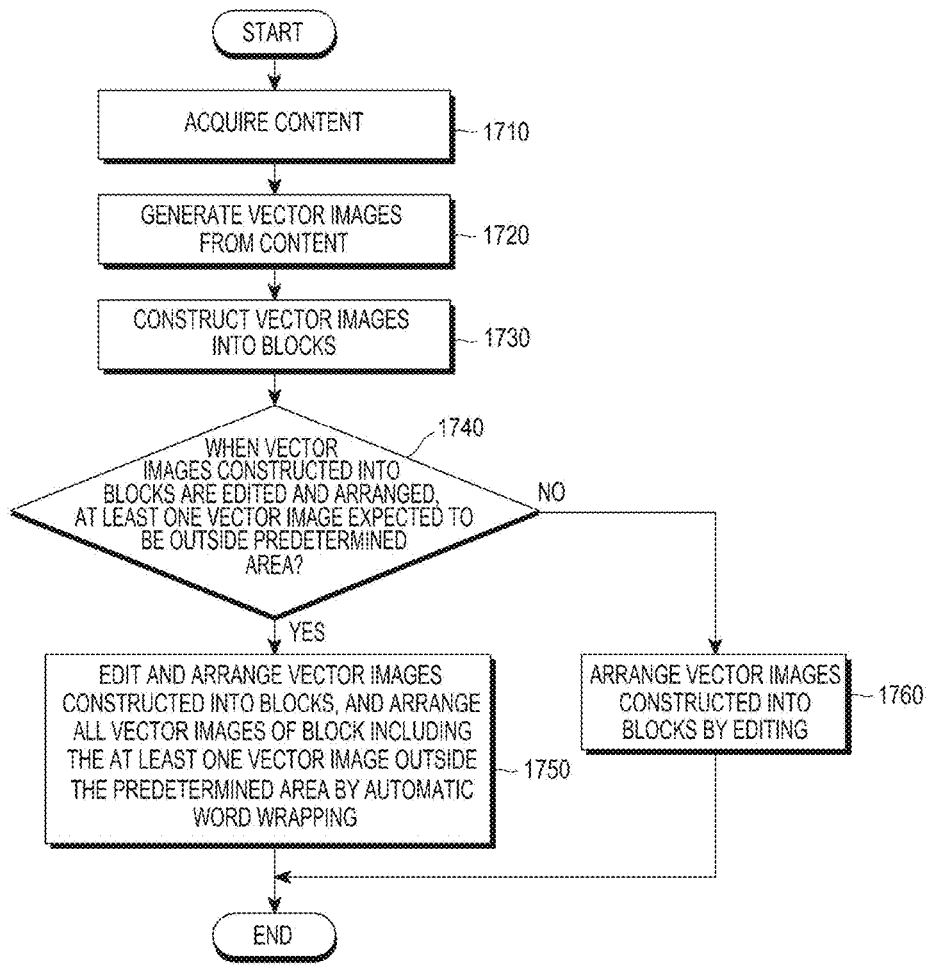
FIG. 17 is a flowchart illustrating a method of editing and arranging the contents of an image according to an embodiment of the present invention.

FIG. 17 is a flowchart illustrating a method of editing and arranging the contents of content (for example, a handwriting image) according to an embodiment of the present invention. In FIG. 17, when acquired content is displayed on a screen, the content may be automatically arranged within a predetermined area of the screen by an automatic word wrap function in the operation for editing and arranging the contents of content. For example, when acquired content (for example, characters included in a handwriting image) is arranged in a predetermined area of a screen, if it is determined that a part of the content is expected to be outside the predetermined area, a new area corresponding to the part of the content may be inserted so that the part of the content may be arranged in the inserted area.

Referring to FIG. 17, the electronic device 100 acquires content (for example, a handwriting image) in operation 1710 and may generate vector images from the content in operation 1720. In operation 1730, the electronic device 100 constructs the vector images into blocks. When the vector images in the blocks are edited and arranged, the electronic device 100 determines whether at least one vector image element to be arranged will be outside a predetermined area in operation 1740. The predetermined area may be, for example, a predetermined manuscript line in the electronic device 100 or a digital note of a specific application. If determining that at least one vector image element to be arranged will be outside the predetermined area in operation 1740, the electronic device 100 proceeds to operation 1750. Otherwise, the electronic device 100 proceeds to operation 1760.

In operation 1750, the electronic device 100 arranges the vector images constructed into the blocks by editing them, while arranging all of the vector images in a block including a vector image expected to be outside the predetermined area by automatic word wrapping. For example, the electronic device 100 may arrange all vector images of a block including a vector image expected to be outside the predetermined area in a new area. The new area may be an area inserted in correspondence with the vector image expected to be outside the predetermined area. For example, the electronic device 100 may insert a new area (a new row or column) under the block including the vector image expected to be outside the predetermined area and then move all vector images of the block to the new area.

In operation 1760, the electronic device 100 arranges the vector images in the blocks by editing them.

Figures 18A, 18B:
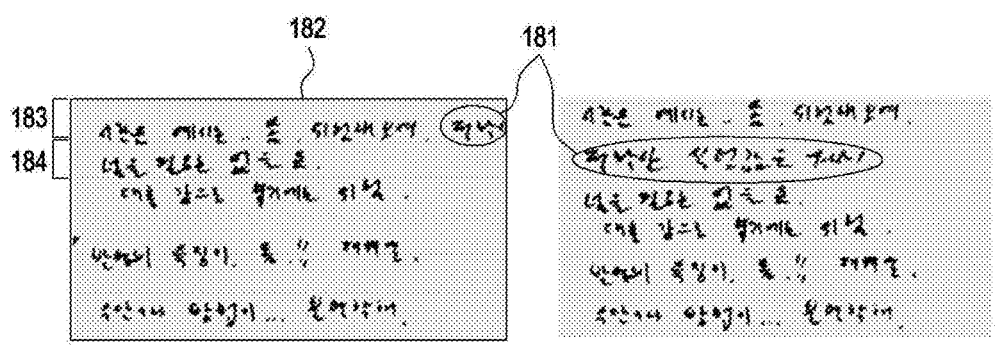
FIGS. 18A and 18B illustrate a result of editing and arranging the contents of an image according to an embodiment of the present invention.

According to the above-described embodiment of the present invention, a result of automatic word wrapping is illustrated in FIG. 18B. Referring to FIG. 18A, if a phrase "정확한 실험값은 이 나나" forms a text block 181, a part of vector images of the text block 181 will be outside a predetermined manuscript line range 182, when the content is initially captured. The text block 181 may be moved to between a row 183 including the character image elements outside the manuscript line range 182 and the next row 184 by automatic word wrapping, as illustrated in FIG. 18B. Therefore, when acquiring a handwriting image, the electronic device 100 arranges the acquired handwriting image within a predetermined canvas (background or manuscript line).

Figure 19:
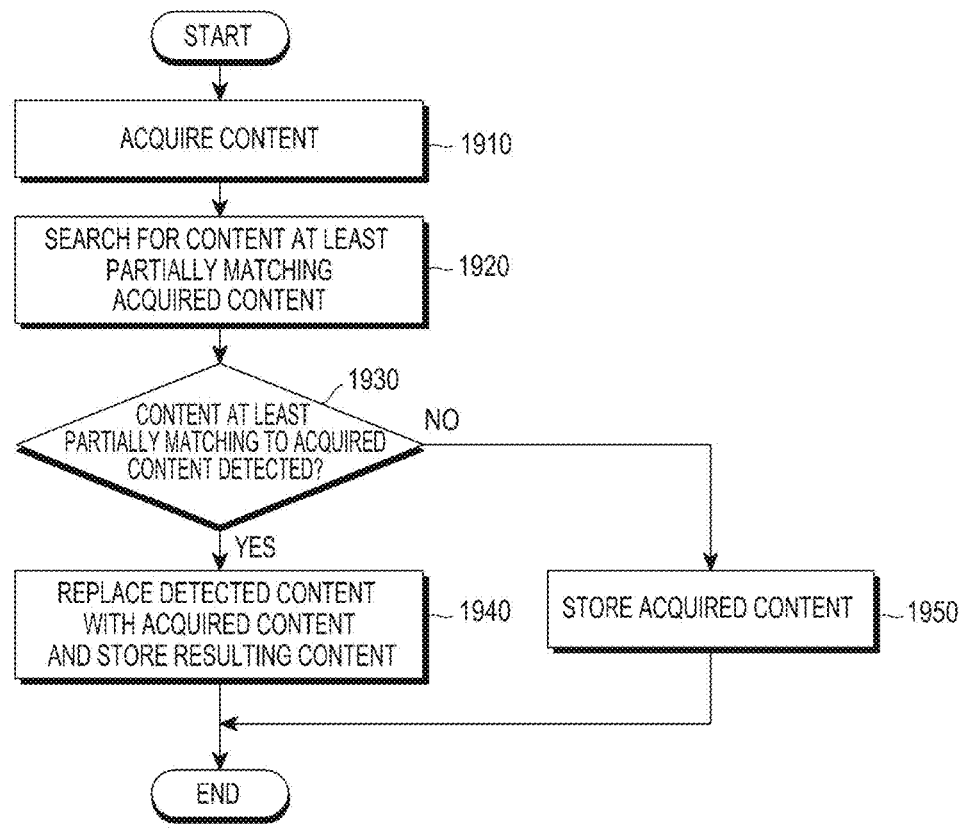
FIG. 19 is a flowchart illustrating a method of editing and arranging the contents of an image according to an embodiment of the present invention.

FIG. 19 is a flowchart illustrating method of editing and arranging the contents of content (for example, an image) according to an embodiment of the present invention. In FIG. 19, if content acquired at different times partially match (for example, sentences or the like), the electronic device 100 updates the initial acquired content only with a difference between the initial acquired content and the next acquired content and arranges the updated content. If an image of a handwritten note is captured, entries are added to the handwritten note, and then an image of the resulting handwritten note is captured, the electronic device 100 updates the initial acquired image only with the added handwritten entries and then arranges and stores the updated initial image.

Referring to FIG. 19, the electronic device 100 acquires content (for example, a handwriting image) according to a user manipulation in operation 1910.

In operation 1920, the electronic device 100 determines whether there is any content matching the acquired content at least partially. The electronic device 100 searches for content at least partially matching the acquired content, for example, content similar or identical to the acquired content among content previously acquired (i.e., initial acquired content) by the electronic device 100 or a network (for example, a cloud device).

In operation 1930, the electronic device 100 determines whether previously acquired content at least partially matching the acquired content has been detected. If content at least partially matching the acquired content is detected, the electronic device 100 proceeds to operation 1940. Otherwise, the electronic device 100 proceeds to operation 1950.

In operation 1940, the electronic device 100 replaces the detected content with the acquired content. The electronic device 100 changes the detected content based on a difference from the acquired content (by deletion, insertion, or replacement) and the detected content, which was previously acquired.

The method of FIG. 19 is described below in detail.

The electronic device 100 converts the acquired content and the detected content into vector images and identifies an added, changed, or deleted vector image in the acquired content by comparing the vector images corresponding to the acquired content and the detected content. In the presence of a newly added vector image in the acquired content, the electronic device 100 adds the newly added vector image to the detected content. In the presence of a changed vector image in the acquired content, the electronic device 100 reflects the changed vector image in the detected content. In the presence of a deleted vector image in the acquired content, the electronic device 100 deletes or temporarily hides the vector image in the detected content.

As vector images are constructed in blocks, the above method may be performed on a block basis. Upon detection of a changed vector image in the acquired content as a result of comparing the acquired content with the detected content, the electronic device 100 reflects the change in the detected content by adding, deleting, or hiding all vector images in a block including the changed vector image.

Figure 20A:
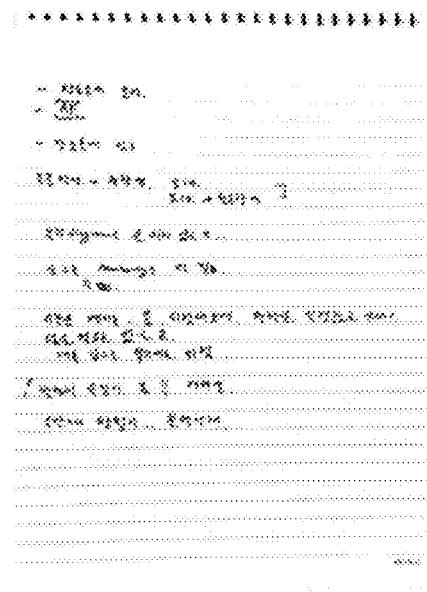
FIGS. 20A and 20B illustrate an image acquired according to an embodiment of the present invention.
Figure 20B:
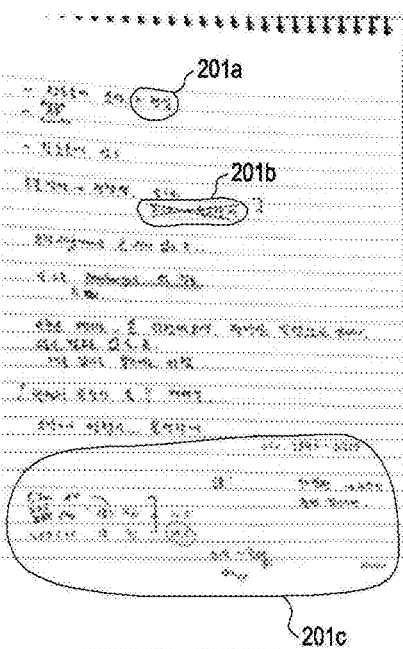

If content as illustrated in FIG. 20B is acquired, the electronic device 100 compares the acquired content with initial acquired content as illustrated in FIG. 20A. Then the electronic device 100 updates the initial acquired content with added content (for example, added handwriting 201a, 201b, 201c) and store the updated content, for example, as illustrated in FIGS. 21A to 22B.

Referring to FIGS. 20A and 20B, the first content illustrated in FIG. 20A is acquired at a first time (i.e., initial acquired content), and the second content illustrated in FIG. 20B is acquired at a second time (for example, the next day). The first content and the second content partially match, for example, the second content further includes additional information (for example, the handwriting 201a, 201b, 201c) as compared to the first content.

According to an embodiment of the present invention, upon acquisition of the second content, the electronic device 100 searches for content similar to or identical to the second content in the electronic device 100 or a network (for example, a cloud device) and thus may detect the first content at east partially matching the second content.

Figure 21A:
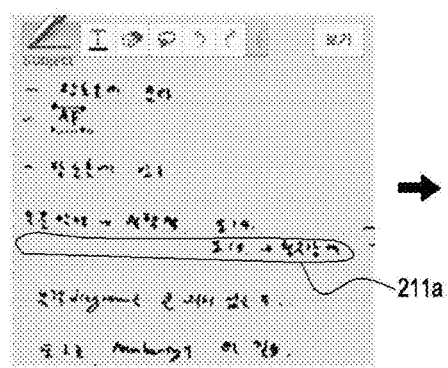
FIGS. 21A and 21B illustrate a result of editing and arranging the contents of an image according to an embodiment of the present invention.
Figure 21B:
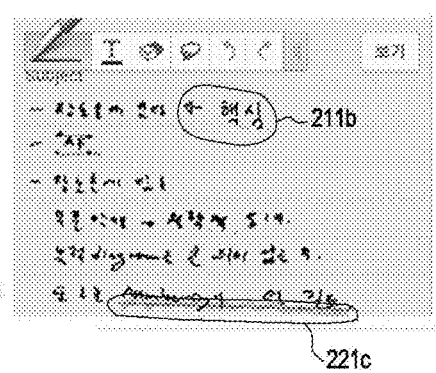

Referring to FIGS. 21A and 21B, if there is no further operation after converting the first content into vector images, the electronic device 100 replaces the first content illustrated in FIG. 21A with the second content illustrated in FIG. 21B. The electronic device 100 may generate differences 211a, 211b, 211c between the first content and the second content and reflect only vector images corresponding to the differences 211a, 211b, 211c in the first content by addition, deletion, or replacement. Additionally, the electronic device 100 may delete or temporarily hide a block with a deleted phrase or a deletion mark between the first content and the second content.

Referring to FIGS. 22A and 22B, if there is no further operations after converting the first content into virtual images, for example, if the user edits the vector images corresponding to the first content, the electronic device 100 generates differences 221a, 221h, 221c between the first content and the second content and reflects only vector images corresponding to the differences 221a, 221b, 221c in the first content by addition, deletion, or replacement.

In regard to an added new item, the electronic device 100 provides a UI through which to receive user confirmation. Referring to FIG. 23, the electronic device 100 indicates to the user that "책심" has been added and a change has occurred to "numbering 이 더 필요" by displaying shades 231 and/or X marks 232 and prompts the user to confirm the addition and change. If the user selects the X marks 232 in FIG. 23, areas (that is, the shaded areas 231) corresponding to the selected X marks 232 return to their original states. The areas (that is, the shaded areas 231) corresponding to the selected X marks 232 may be edited or added with a new item.

The electronic device 100 may prompt the user to confirm deletion before applying a deletion function to a deleted phrase or an area labeled with a deletion mark. Even though the contents of a specific area are not shown temporarily due to application of a temporary hiding function, the electronic device 100 may show the area again, upon recognition of a specific gesture or input (for example, hovering).

Figure 24:
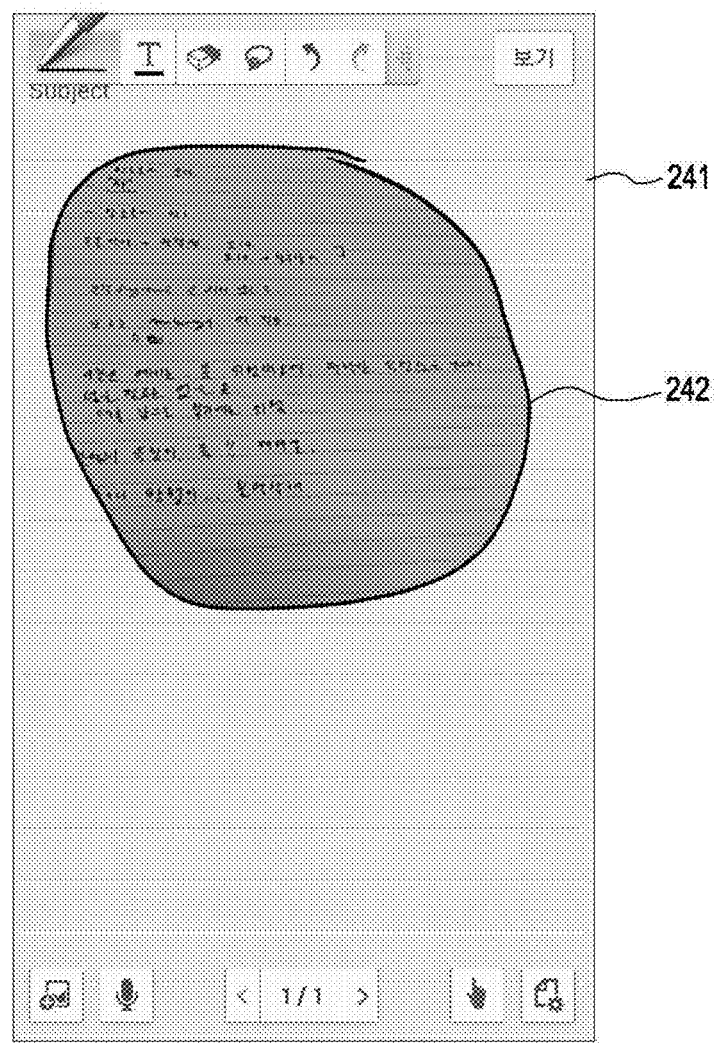
FIG. 24 illustrates a result of editing and arranging the contents of an image according to an embodiment of the present invention.

A operation for editing and arranging the contents of content (for example, an image) according to an embodiment of the present invention will be described with reference to FIG. 24. In FIG. 24, the electronic device 100 further indicates an input position 242 of added new content on an electronic note 241 in response to a user manipulation. In addition, the electronic device 100 stores the added new content in relation to the input position 242.

Referring to FIG. 24, the electronic device 100 designates the area 242 on the electronic note 241 displayed on a screen in an application, for example, in a memo application, in response to a user manipulation. The electronic device 100 displays and stores content acquired through the camera module in the area 242 by executing a preset function. If the content is a handwriting image, the electronic device 100 automatically arranges the contents of the handwriting image so that the user may readily view the handwriting according to an embodiment of the present invention described above, before the handwriting image is displayed and/or stored.

Figure 25:
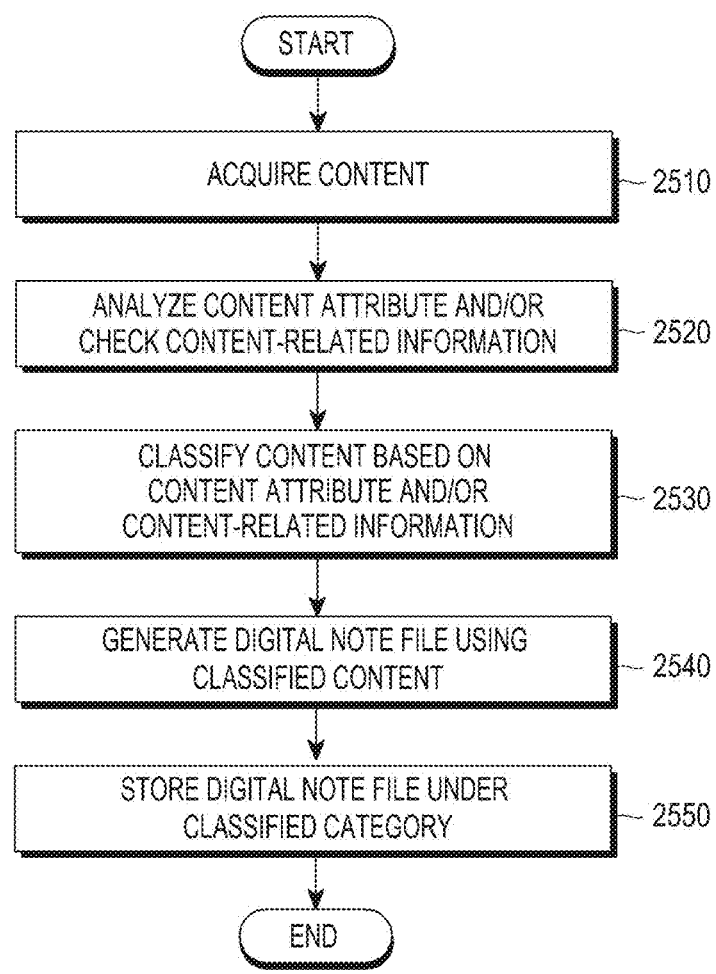
FIG. 25 is a flowchart illustrating a method of classifying an image according to an embodiment of the present invention.
Figure 27A:
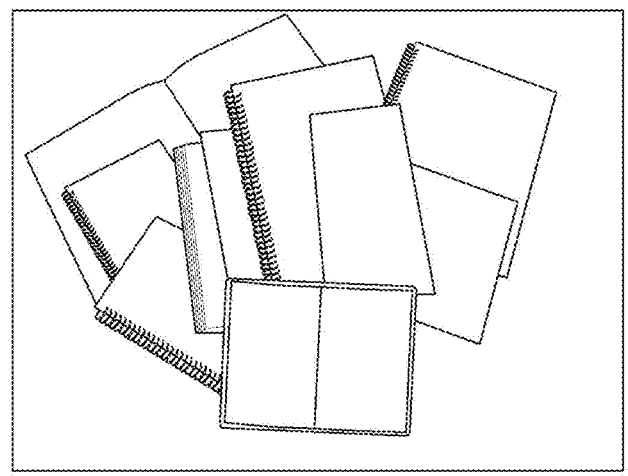
FIGS. 27A and 27B illustrate images of various kinds of notes according to an embodiment of the present invention.
Figure 27B:
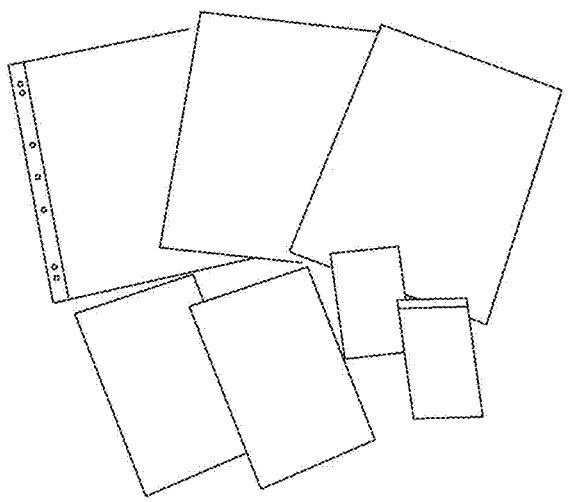

FIG. 25 is a flowchart illustrating a method of classifying content (for example, an image) according to an embodiment of the present invention. In FIG. 25, the electronic device 100 classifies acquired content into a category according to at least one of attribute information about the content or information related to the content (for example, attribute information or related information about a note image), and stores the content under the classified category. The content may be, for example, content acquired through the camera module, vector images generated from the acquired content, or Hocks into which the vector images are constructed. The content may be acquired in various manners and may take various forms.

Referring to FIG. 25, the electronic device 100 acquires content (for example, a note image) in operation 2510.

The electronic device 100 analyzes an attribute of the content and/or check information related to the content in operation 2520. In operation 2530, the electronic device 100 classifies the content according to the attribute information and/or the related information.

Attributes of the content may be divided into, for example, formal attributes and substantial attributes. The formal attributes may include, for example, a pattern, a color, an image, or a predetermined shape included in the content, or a specific ratio of the content. The substantial attributes are related to substantial information about the content. The substantial attributes may be attributes related to characters included in the content.

Operation 2520 and operation 2530 for analyzing an attribute of acquired content and checking information related to the acquired content are described below in greater detail.

In operation 2040, the electronic device 100 creates a digital note file of a predetermined format using the classified content. The electronic device 100 generates a vector file (or a vector image file) with vector images created from the acquired content, for example, by editing and arranging content as described above. The electronic device 100 may generate a digital note file by generating vector images from the acquired content and editing and arranging the generated vector images by editing and arranging content as described above.

In operation 2050, the electronic device 100 may store the digital note file under the classified category.

Classifying content by analyzing an attribute of the content according to an embodiment of the present invention is described below.

The electronic device 100 may recognize at least one of a pattern included in content (for example, a note image), the shape of the content, the format of the content, or a character included in the content and performs attribute analysis based on the recognized information.

In attribute analysis based on a pattern included in the content, the electronic device 100 recognizes a pattern printed in the content and refers to pre-stored pattern information in regard to the recognized pattern. If the electronic device 100 acquires note images illustrated in FIGS. 26A to 26D, the electronic device 100 may recognize patterns included in the note images, that is, characters, line spaces, or colors or patterns (watermarks) of backgrounds and check pre-stored information in regard to the recognized patterns. The attribute analysis based on a pattern included in content is performed by recognizing a pattern, that is, an identifier such as a Quick Response (QR) code in the electronic device 100.

Figures 28A, 28B:
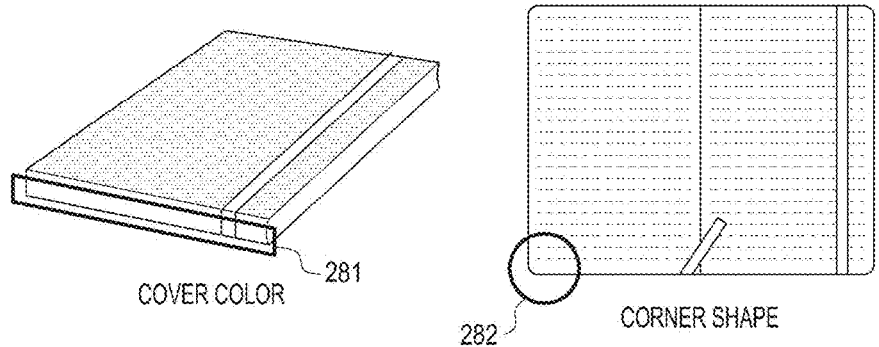
FIGS. 28A, 28B, 28C, and 28D are views referred to for describing attribute analysis based on the shapes of notes according to an embodiment of the present invention.
Figures 28C, 28D:
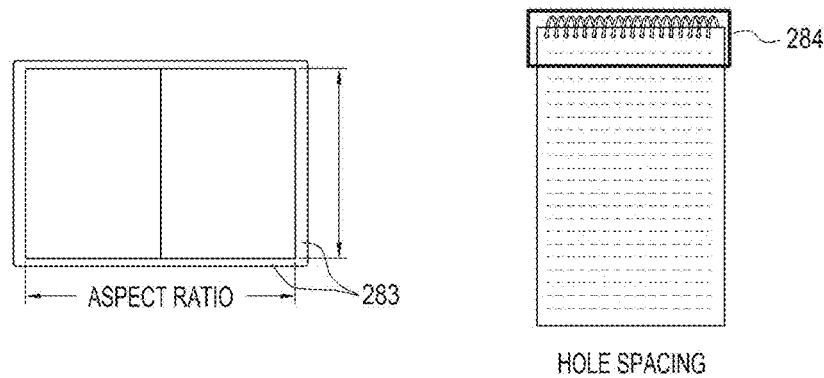
Figure 29:
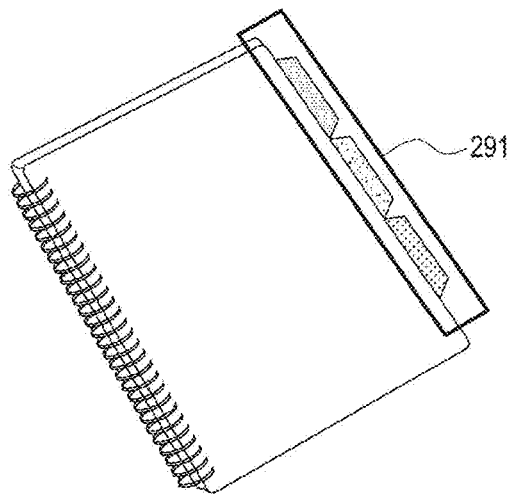
FIG. 29 illustrates a note image referred to for describing attribute analysis based on the shape of a note according to an embodiment of the present invention.
Figure 30A:
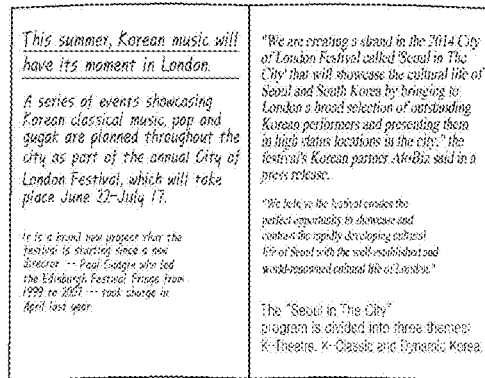
FIGS. 30A and 30B illustrate note images referred to for describing attribute analysis based cm characters recognized from note images according to an embodiment of the present invention.
Figure 30B:
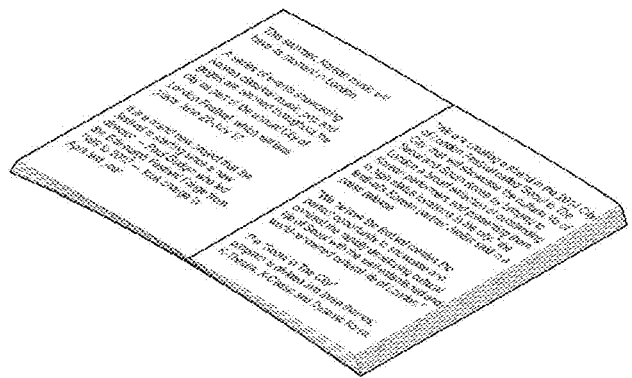

In attribute analysis based on the shape of content, the electronic device 100 recognizes at least one of the color, corner shape, or aspect ratio of acquired content and refers to pre-stored shape information (or pre-stored reference information) in regard to the recognized information. If the electronic device 100 acquires one of various note images illustrated in FIGS. 27A and 27B, the electronic device 100 may recognize a cover color 281 of an area as illustrated in FIG. 28A and check pre-stored information in regard to the recognized cover color 281. The electronic device 100 may recognize the color of a whole cover and check pre-stored information in regard to the recognized color. The electronic device 100 may recognize a corner shape 282, an aspect ratio 283, and/or a hole spacing 284 of a spiral binding in the note image, as illustrated in FIGS. 288, 28C, and 28D, respectively, and then may check pre-stored information in regard to the recognized information. The electronic device 100 may determine the ratio between a page size and a character size in the note image and then check pre-stored information in regard to the determined ratio. The electronic device 100 may recognize indexing labels 291 as illustrated in FIG. 29 and then check pre-stored information in regard to the recognized indexing labels 291. When the note is opened, the indexing labels 291 may be positioned at the left/right side of the note. The electronic device 100 may determine the type of the captured note according to the position of the indexing labels 291. For example, if a note with indexing labels 1, 2, and 3 is opened to an arbitrary page and captured and the electronic device 100 detects indexing label 1 at the left side of the opened page and indexing labels 2 and 3 at the right side of the opened page, the electronic device 100 may classify the opened page as a note related to indexing label 1.

In attribute analysis based on the format (for example, a conference minute, a journal, a receipt, or the like) of content (for example, a note image), the electronic device 100 recognizes text at a predetermined position (for example, by OCR or the like) and analyzes the contents of the text. If the recognized text is a name, the format of the content may be a test paper, a questionnaire, a pledge, a contract, or the like. If the recognized text is a date, the format of the content may be a conference minute, a journal, a research note, a schedule, or the like. If the recognized text is numbers, the format of the content may be a receipt, a household account book, or the like.

The electronic device 100 may classify content by recognizing characters included in the content as an attribute of the content. The electronic device 100 recognizes a character in acquired content, compares at least one of the stroke thickness or blotting degree of the character with pre-stored information, identifies the type of a pen with which the character was written based on the comparison, and thus classifies the content according to the pen type. The electronic device 100 may classify content by recognizing the handwriting style of a character in the content. If the electronic device 100 acquires images of note pages written by a plurality of users, the electronic device 100 classifies the images by recognizing the images by writer. The electronic device 100 may classify content by recognizing the color of a character in the content. The electronic device 100 may classify content by recognizing the contents of text in the content. The electronic device 100 may recognize a word, a sentence, a language, or the like in the content and classify the content into a category. If the electronic device 100 recognizes an equation or a formula in content, the electronic device 100 may classify the content into a math-related category. If the electronic device 100 recognizes a word related to an ingredient such as "sugar," "salt," or the like, the electronic device 100 may classify the content into a recipe-related category. The electronic device 100 may classify content into a conference minute-related category based on the name of a participant listed in a participant list, the time and place of a conference, or the title of a conference minute. Considering that probability terms are frequently used in a random process class and foreign country names and the names of persons are frequently used in a foreign studies class, if words of similar characteristics are repeated, the electronic device 100 may recognize the words and classify corresponding content into a specific category based on the recognized words.

The electronic device 100 may classify content by applying editing and arranging content to classifying content based on characters recognized from the content as an attribute of the content. In the case of note images having characters written in different fonts by different pen types illustrated in FIGS. 30A and 30B, the electronic device 100 recognizes characters in the note images, determines at least one of the stroke thicknesses, blotting degrees, or fonts (or handwriting styles) of the recognized characters, classifies the note images by comparing the determined information with pre-stored information, and includes the note images in a corresponding page of a predetermined electronic note.

Classifying content based on content-related information is described below.

The electronic device 100 may check information related to acquired content using at least one of scheduling information stored in the electronic device 100, information about the location of the electronic device 100, or current time information. According to an embodiment of the present invention, when the electronic device 100 acquires content, the electronic device 100 determines a time and a place in which the content has been acquired and classifies the content by comparing the time and place with predetermined scheduling information. If the electronic device 100 acquires content by capturing a handwritten note in school, the electronic device 100 classifies the captured content into a category related to a class subject by checking a classroom and a time in which the content has been captured.

The electronic device 100 updates pre-stored content in relation to the class subject using the captured content by editing and arranging content in accordance with an embodiment of the present invention.

In the case where content is classified by analyzing a content attribute or checking information related to content, if there is no reference data for classification or classification is not available due to the lack of information, the electronic device 100 classifies the content using tag information about the content. The tag information may be input by the user. When the content is acquired, the tag information may also be automatically acquired and stored in the electronic device 100, such as information about an image acquisition place (based on the GPS), information about an image acquisition time, and the like.

If the electronic device 100 acquires content by capturing pages of a note or a book while turning to the pages by a continuous capturing function (for example, a video capturing function), the electronic device 100 recognizes page turning by comparing current scanned information with previously scanned information and arranges and stores the scanned pages by editing and arranging content as described above. For example, the electronic device 100 may sequentially generate pages of a digital note with content acquired through continuous capturing by editing and arranging content and classifying content as described above.

The electronic device 100 may process content according to the foregoing embodiments of the present invention. While specific embodiments of the present invention have been described above, other embodiments may be implemented or modifications or variations may be made. An embodiment of the present invention described herein may be performed in parallel wholly or partially, a operation of an embodiment may be omitted, or a operation may be added to an embodiment.

For example, if a block is wholly rotated within a predetermined range, the electronic device 100 may rotate the entire block to a predetermined angle when arranging content by adjusting the rotation degrees of vector images on a block basis. A block may take the form of a rectangle or any other polygon. The electronic device 100 may determine the rotation degrees of vector images by determining the rotation degrees of polygons.

Once the electronic device 100 acquires content, the electronic device 100 may arrange the content in a predetermined canvas (or background) by combining embodiments of the present invention. For example, the electronic device 100 may increase or decrease the size of content so that the entire content may fall within a canvas range. If a specific block (or image element) of the content is contracted to or below a predetermined size due to the decreased size of the content and thus is less legible, the electronic device 100 may maintain the size of the specific block (or image element) in or above the predetermined size and subject a block (or image element) outside the canvas to automatic word wrapping.

While it is described above that initial acquired content and next acquired content have content in common, the initial acquired content is updated by reflecting only the difference between the initial acquired content and the next acquired content in the initial acquired content, arranged, and then stored, it may be further contemplated as another embodiment that different contents acquired at different times may be combined. For example, the electronic device 100 may add the next acquired content to the is acquired content and update, arrange, and store the resulting content.

Figure 31:
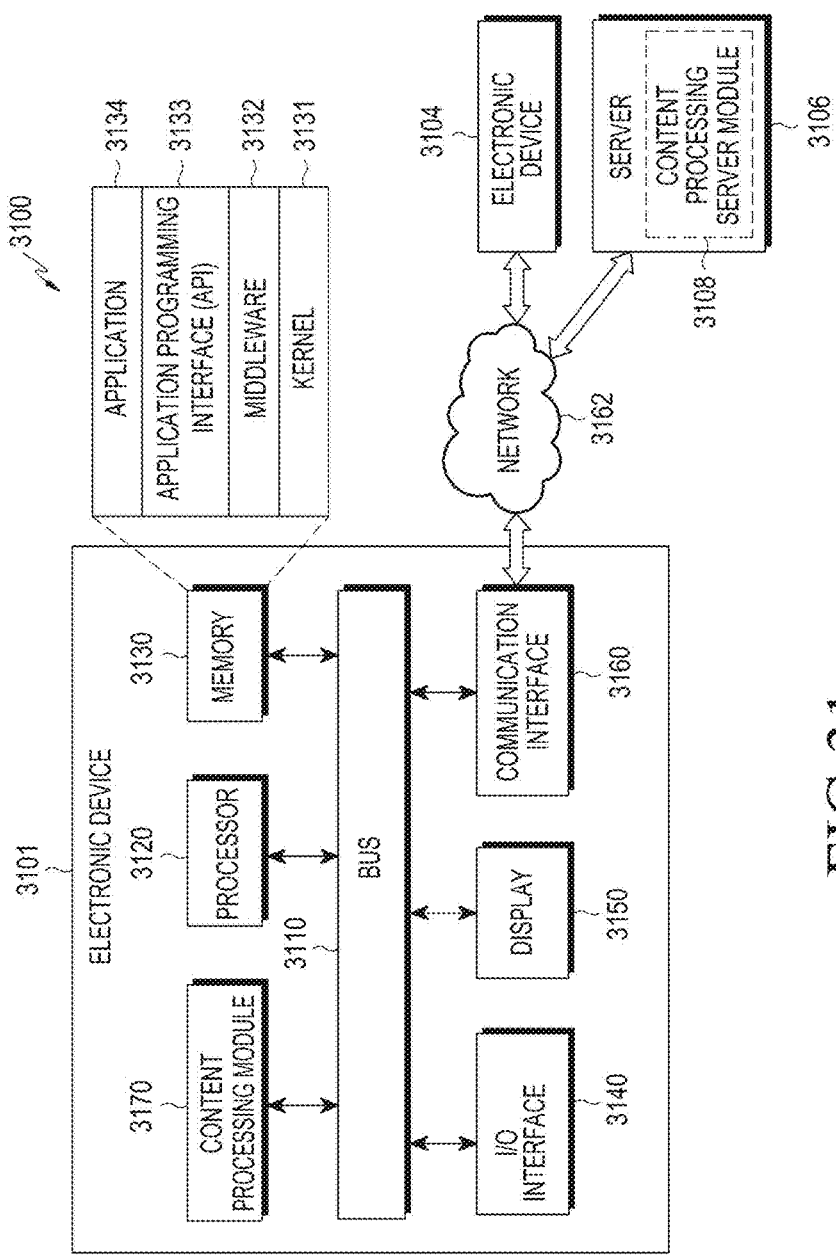
FIG. 31 is a block diagram of a network environment including an electronic device according to an embodiment of the present invention.

FIG. 31 is a block diagram of a network environment 3100 including an electronic device 3101 according to an embodiment of the present invention.

Referring to FIG. 31, the electronic device 3101 includes a bus 3110, a processor 3120, a memory 3130, an Input/Output (I/O) interface 3140, a display 3150, a communication interface 3160, and a content processing module 3170.

The bus 3110 is a circuit that connects the foregoing components and controls communication (for example, transmission of control messages) between the foregoing components.

The processor 3120 receives instructions from other components (for example, the memory 3130, the I/O interface 3140, the display 3150, the communication interface 3160, or the content processing module 3170), interprets the received instructions, and executes computation or data processing according to the interpreted instructions.

The memory 3130 stores instructions or data received from or generated by the processor 3120 or other components (for example, the I/O interface 3140, the display 3150, the communication interface 3160, or the content processing module 3170). The memory 3130 includes programming modules such as a kernel 3131, a middleware 3132, an Application Programming Interface (API) 3133, or an application 3134. Each of the foregoing programming modules may include software, firmware, hardware, or any combination thereof.

The kernel 3131 controls or manages system resources (for example, the bus 3110, the processor 3120, or the memory 3130) that are used in executing operations or functions implemented in other programming modules such as, for example, the middleware 3132, the API 3133, or the application 3134. Also, the kernel 3131 provides an interface for allowing the middleware 3132, the API 3133, or the application 3134 to access individual components of the electronic device 3101.

The middleware 3132 is a medium through which the kernel 3131 communicates with the API 3133 or the application 3134 to transmit and receive data. Also, the middleware 3132 performs scheduling or load balancing in regard to work requests by one or more applications 3134 by, for example, assigning priorities for using system resources (the bus 3110, the processor 3120, or the memory 3130) of the electronic device 3101 to one or more applications 3134.

The API 3133 is an interface for controlling functions that the application 3134 provides at the kernel 3131 or the middleware 3132. The API 3133 may include at least one interface or function (for example, a command) for file control, window control, video processing, or text control.

According to an embodiment of the present invention, the application 3134 may include, for example, a Short Message Service (SMS) Multimedia Messaging Service (MMS) application, an email application, a calendar application, an alarm application, a health care application (for example, an exercise amount or blood sugar level measuring application) or an environmental information application (for example, an application that provides atmospheric pressure, humidity or temperature information). Additionally or alternatively, the application 3134 may be an application associated with information exchange between the electronic device 3101 and an external electronic device (for example, art electronic device 3104). The application associated with the information exchange may include, for example, a notification relay application for providing the external electronic device with specific information, or a device management application for managing the external electronic device.

For example, the notification relay application may include functionality that provides notification generated by other applications at the electronic device 3101 (for example, an SMS/MMS application, an email application, a health care application, or an environmental information application) to an external electronic device (for example, the electronic device 3104). Additionally or alternatively, the notification relay application may provide, for example, receive notification from an external electronic device (for example, the electronic device 3104) and provide the notification information to a user. The device management application may enable or disable functions associated with at least a part of an external electronic device (for example, the external electronic device itself, or one or more components of the external electronic device) in communication with the electronic device 3101, control of brightness (or resolution) of a display of the external electronic device, or manage (for example, install, delete, or update) an application operated at, or service (for example, voice call service or messaging service) provided by the external electronic device.

According to an embodiment of the present invention, the application 3134 may include, for example, one or more applications that are determined according to an attribute (for example, the type) of the external electronic device (for example, the electronic device 3104). For example, if the external electronic device is an MP3 player, the application 3134 may include an application related to music playback. If the external electronic device is a mobile medical device, the application 3134 may include a health care-related application. According to an embodiment of the present invention, the application 3134 may include at least one of an application that is preloaded in the electronic device 3101 or an application that is received from an external electronic device (for example, the electronic device 3104 or a server 3106).

The I/O interface 3140 receives an instruction or data from a user through an I/O device (for example, a sensor, a keyboard, or a touch screen) and transmits, via the bus 3110, the instruction or data to the processor 3120, the memory 3130, the communication interface 3160, or the content processing module 3170. For example, the IO interface 3104 may provide data associated with a user touch input received via the touch screen to the processor 3120. Also, the I/O interface 3140 may, for example, output instructions or data received via the bus 3110 from the processor 3120, the memory 3130, the communication interface 3160, or the content processing module 3170, via the IO device (for example, a speaker or a display).

The display 3150 displays various types of information (for example, multimedia or text data) to the user.

The communication interface 3160 provides communication between the electronic device 3101 and an external electronic device (for example, the electronic device 3104 or the server 3106). The communication interface 3160 communicates with the external electronic device by establishing a connection with a network 3162 using wireless or wired communication. The wireless communication may be at least one of, for example, Wireless Fidelity (Wi-F), Bluetooth, Near Field Communication (NFC). Global Positioning System (GPS), or cellular communication (for example, Long Tem Evolution (LTE), LTE-Advanced (LTE-A), Code Division Multiple Access (CDMA), Wideband CDMA (WDCMA), Universal Mobile Telecommunications System (UMTS), Wireless Broadband (WiBro), or Global System for Mobile communications (GSM)). The wired communication may be at least one of for example, Universal Serial Bus (USB), High Definition Multimedia Interface (HDMI), Recommended Standard 232 (RS 232) or Plain Old Telephone Service (POTS).

According to an embodiment of the present invention, the content processing module 3170 may be the controller 150. The content processing, module 3170 acquires at least one piece of content, analyzes the acquired content, and classifies the content into at least one of a plurality of categories. The content processing module 3170 generates vector images from the content and displays at least a part of the vector images on a display functionally connected to the electronic device 3101.

According to an embodiment of the present invention, the network 3162 is a telecommunications network. The telecommunications network includes at least one of for example, a computer network, the Internet, the Internet of Things, or a telephone network. According to an embodiment of the present invention, a protocol (for example, transport layer protocol, data link, layer protocol, or physical layer protocol) for communicating between the electronic device 3101 and an external electronic device is supported by, for example, at least one of the application 3134, the API 3133, the middleware 3132 the kernel 3131, or the communication interface 3160.

According to an embodiment of the present invention, the server 3106 supports the electronic device 3101 by performing at least one of the operations (or functions) of the electronic device 3101. For example, the server 3106 may include a content processing server module 3108 that supports the content processing module 3170 of the electronic device 3101. For example, the content processing server module 3108 may include at least one of the components of the content processing module 3170 and thus may perform at least one of the operations of the content processing module 3170 on behalf of the content processing module 3170.

Figure 32:
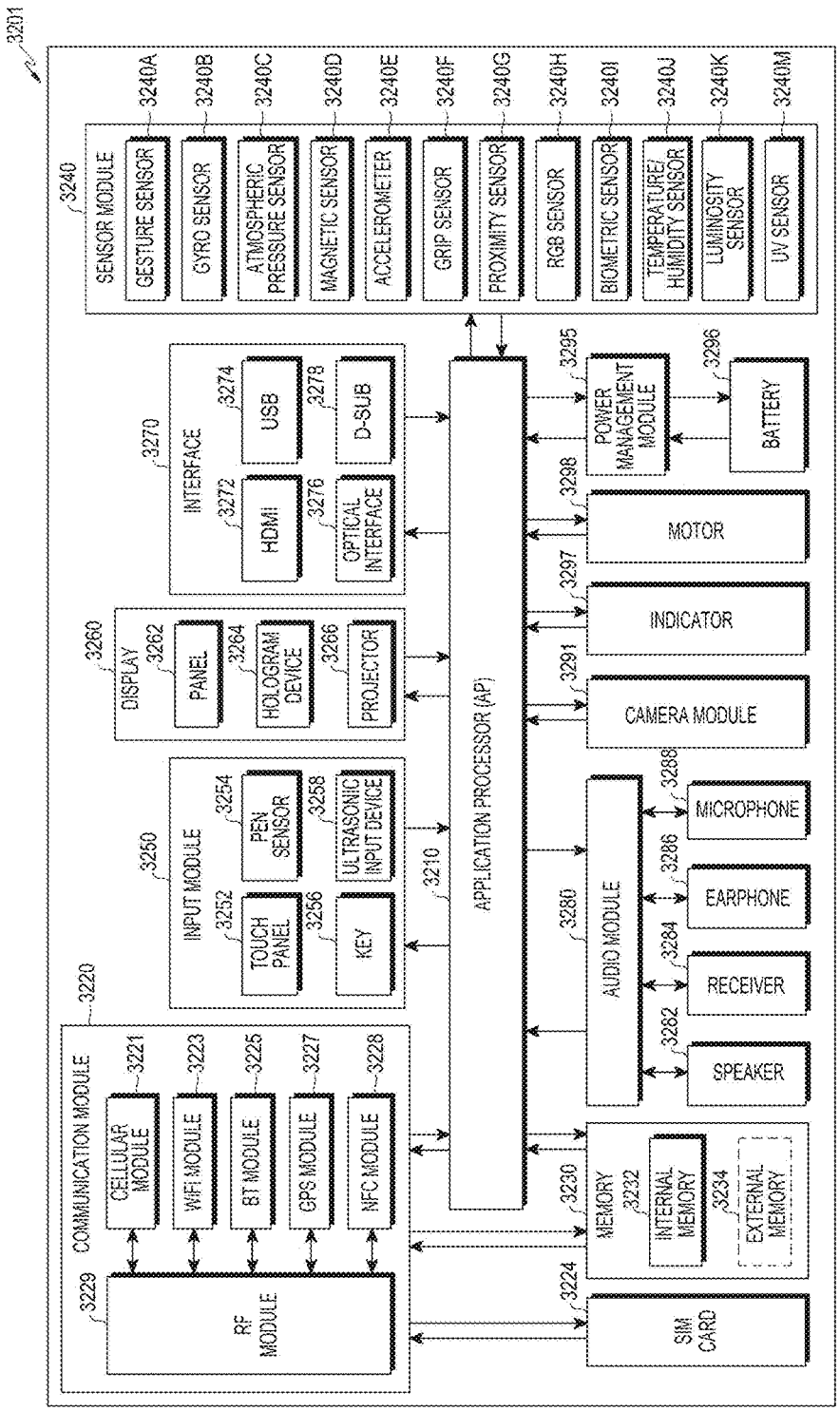
FIG. 32 is a block diagram of an electronic device according to an embodiment of the present invention.

FIG. 32 is a block diagram of an electronic device 3201 according to various embodiments of the present invention.

Referring to FIG. 32, the electronic device 3201 may be, for example, a part or whole of the electronic device 3101 illustrated in FIG. 31. The electronic device 3201 includes at least one Application Processor (AP) 3210, a communication module 3220, a Subscriber Identification Module (SIM) card 3224, a memory 3230, a sensor module 3240, an input module 3250, a display 3260, an interface 3270, art audio module 3280, a camera module 3291, a power management module 3295, a battery 3296, an indicator 3297, and a motor 3298.

The AP 3210 controls one or more hardware or software components that are connected to the AP 3210 by executing an Operating System (OS) or art application program, or performs processing or computation of data including multimedia data. The AP 3210 may be implemented, for example, as a System-on-Chip (SoC). The AP 3210 may further include a Graphics Processing Unit (GPU).

The communication module 3220 (for example, the communication interface 3160 illustrated in FIG. 31) transmits and receives data in communications between the electronic device 3201 and another electronic device (for example, the electronic device 3104 or the server 3106 illustrated in FIG. 31). According to an embodiment of the present invention, the communication module 3220 may include, for example, one or more of a cellular module 3221, a Wi-Fi module 3223, a BlueTooth (BT) module 3225, a GPS module 3227, an WC module 3228, and a Radio Frequency (RF) module 3229.

The cellular module 3221 provides voice call, video call, SMS, or Internet service via a communication network (for example, LTE, LIE-A, CDMA, WCDMA, UMTS, WiBro or GSM). The cellular module 3221 also identifies and authorizes electronic devices within a communication network, using a Subscriber Identification Module (for example, the SIM card 3224). According to an embodiment of the present invention, the cellular module 3221 performs at least a part of the functionality of the AP 3210. For example, the cellular module 3221 may perform at least a part of multimedia control functionality.

According to an embodiment of the present invention, the cellular module 3221 may include a Communication Processor (CP). The cellular module 3221 may, for example, be implemented as an SoC. Although FIG. 32 shows components such as the cellular module 3221, the memory 3230, and the power management module 3295 as components that are separate from the AP 3210, according to the present invention, the AP 3210 may include, or be integrated with, one or more of the foregoing components (for example, the cellular module 3221).

According to an embodiment of the present invention, the AP 3210 or the cellular module 3221 (for example, a CP) processes instructions or data received from at least one of a non-volatile memory or other components connected to the AP 3210 or the cellular module 3221 by loading the instructions or data in a volatile memory. In addition, the AP 3210 or the cellular module 3221 stores data at the non-volatile memory that is received from, or generated by, at least one of the other components.

Each of the Wi-Fi module 3223, the BT module 3225, the OPS module 3227, and the NFC module 3228 may, for example, include a processor for processing data received or transmitted by the respective modules. Although FIG. 32 shows the cellular module 3221, the Wi-Fi module 3223, the BT module 3225, the GPS module 3227, and the NFC module 3228 as separate blocks, any combination (for example, two or more) thereof may be included in an Integrated Circuit (IC) or an IC package. For example, at least a part (for example, a CP corresponding to the cellular module 3221 and a Wi-Fi processor corresponding to the WI-FI module 3223) of the processors corresponding to the respective cellular module 3221, the Wi-Fi module 3223, the BT module 3225, the GPS module 3227, and the NFC module 3228 may be implemented as a single SoC.

The RF module 3229 transmits and receives RF signals. The RF module 3229 may include a transceiver, a Power Amp Module (PAM), a frequency filter, or a Low Noise Amplifier (LNA). The RF module 3229 may further include one or more components for transmitting and receiving Electro-Magnetic (EM) waves in free space such as, for example, conductors or conductive wires. Although FIG. 32 shows that the cellular module 3221, the Wi-Fi module 3223, the BT module 3225, the OPS module 3227, and the NFC module 3228 share the single RF module 3229, according to an embodiment of the present invention, at least one of the cellular module 3221, the Wi-Fi module 3223, the BT module 3225, the GPS module 3227, and the NFC module 3228 may transmit and receive RF signals via a separate RF module.

The SIM card 3224 includes a SIM, and is configured to be inserted into a slot disposed at a location of the electronic device. The SIM card 3224 includes a unique identifier (for example, Integrated Circuit Card IDentifier (ICCID)) or subscriber information (for example, International Mobile Subscriber Identity (IMSI)).

The memory 3230 (for example, the memory 3130 illustrated in FIG. 31) may include an internal memory 3232 or an external memory 3224. The internal memory 3232 includes, for example, at least one of a volatile memory (for example, Dynamic RAM (DRAM), Static RAM (SRAM) or Synchronous Dynamic RAM (SDRAM)) or a non-volatile memory (for example, One Time Programmable ROM (OT-PROM), Programmable ROM (PROM), Erasable and Programmable ROM (EPROM), Electrically Erasable and Programmable ROM (EEPROM), mask ROM, flash ROM, NAND flash memory or NOR flash memory).

According to an embodiment of the present invention, the internal memory 3232 may be a Solid State Drive (SSD). The external memory 3234 may be, for example, a flash drive (for example, a Compact Flash (CE) drive, a Secure Digital (SD), a micro Secure Digital (micro-SD), a mini Secure Digital (mini-SD), an extreme Digital (xD) or a Memory Stick). The external memory 3234 may be functionally connected to the electronic device 3201 via various interfaces. According to an embodiment of the present invention, the electronic device 3201 may include a recording device (or recording medium) such as, for example, a Hard Disk Drives (HDD).

The sensor module 3240 measures physical amounts or detects operational states associated with the electronic device 3201 and converts the measured or detected information into signals such as, for example, electrical signals. The sensor module 3240 includes at least one of, for example, a gesture sensor 3240A, a gyro sensor 3240B, an atmospheric pressure sensor 3240C, a magnetic sensor 3240D, an accelerometer 3240E, a grip sensor 3240F, a proximity sensor 3240G, a color sensor 3240H (for example, a Red, Green, Blue (RGB) sensor), a biometric sensor 3240I, a temperature humidity sensor 3240J, a luminosity sensor 3240K, or an Ultra Violet (UV) light sensor 3240M. Additionally or alternatively, the sensor module 3240 may also include an electrical-nose sensor, an ElectroMyoGraphy (EMG) sensor, an ElectroEncephaloGram (EEG) sensor, an InfraRed (IR) sensor, an iris sensor, or a fingerprint sensor. The sensor module 3240 may also include a control circuit for controlling one or more sensors included therein.

The input module 3250 includes a touch panel 3252, a (digital) pen sensor 3254, a key 3256, or an ultrasonic input device 3258. The touch panel 3252 detects touch input using, for example, capacitive, resistive, infrared or ultrasonic methods. The touch panel 3252 may also include a control circuit. A capacitive type touch panel may, for example, detect proximity inputs (e.g. hovering input) in addition to, or alternative to, physical touch inputs. The touch panel 3252 may also include a tactile layer. In this case, the touch panel 3252 may provide a haptic feedback to the user using the tactile layer.

The (digital) pen sensor 3254 may be implemented, for example, using methods identical to or similar to receiving a touch input from a user, or using a separate detection sheet. The key 3256 may be, for example, a physical button, an optical key, or a keypad. The ultrasonic input device 325 may be a device configured to identify data by detecting, using a microphone (for example, a microphone 3288), ultrasonic signals generated by a device capable of generating the ultrasonic signal. The ultrasonic input device 3258 may detect data wirelessly. According to an embodiment of the present invention, the electronic device 3201 may receive a user input from an external device (for example, a computer or a server) connected to the electronic device 3201 using the communication module 3220.

The display 3260 (for example, the display 3150 illustrated in FIG. 31) includes a panel 3262, a hologram device 3264, or a projector 3266. The panel 3262 may be, for example, a Liquid-Crystal Display (LCD) or an Active-Matrix Organic Light-Emitting Diode (AM-OLED) display. The panel 3262 may be configured to be, for example, flexible, transparent or wearable. The panel 3262 and the touch panel 3252 may be implemented as a single module. The hologram device 3264 may utilize the interference of light waves to provide a three-dimensional image in empty space. The projector 3266 may provide an image by projecting light onto a screen. The screen may, for example, be positioned inside or outside the electronic device 3201. According to an embodiment of the present invention, the display 3260 may also include a control circuit for controlling the panel 3262, the hologram device 3264, or the projector 3266.

The interface 3270 includes, for example, one or more interfaces for a HDMI 3272, a USB 3274, an optical projector 3276, or a D-subminiature (D-sub) 3278. The interface 3270 may be included, for example, in the communication interface 3160 illustrated in FIG. 31. Additionally or alternatively, the interface 3270 may include, for example, one or more interfaces for Secure Digital (SD)/MultiMedia Card (MMC) or Infrared Data Association (IrDA).

The audio module 3280 encodes/decodes a voice into an electrical signal, and vice versa. At least a part of the components of the audio module 3280 may be included, for example, in the I/O interface 3140 illustrated in FIG. 31. The audio module 3280 may, for example, encode decode voice information that is input into, or output from, a speaker 3282, a receiver 3284, an earphone 3286, or the microphone 3288.

The camera module 3291 captures a still image or a video. According to an embodiment of the present invention, the camera module 3291 may include one or more image sensors (for example, a front sensor or a rear sensor), a lens, an Image Signal Processor (ISP), or a flash (for example, a Light Emitting Diode (LED) or a xenon lamp).

The power management module 3295 manages electrical power of the electronic device 3201. The power management module 3295 may include, for example, a Power Management Integrated Circuit (PMIC), a charger IC, or a battery or fuel gauge.

The PMIC, for example, may be disposed in an IC or an SoC semiconductor. The charging method for the electronic device 3201 may include wired or wireless charging. The charger IC may charge a battery, or prevent excessive voltage or excessive current from a charger from entering the electronic device 3201. According to an embodiment of the present invention, the charger IC may include at least one of a wired charger IC or a wireless charger IC. The wireless charger IC may be, for example, as magnetic resonance type, a magnetic induction type, or an electromagnetic wave type, and may include circuits for wireless charging, such as a coil loop, a resonant circuit, or a rectifier.

The battery gauge may measure, for example, charge level, voltage while charging, or temperature of the battery 3296. The battery 3296 may supply power to, for example the electronic device 3201. The battery 3296 may be, for example, a rechargeable battery or a solar battery.

The indicator 3297 indicates one or more states (for example, boot status, message status, or charge status) of the electronic device 3201 or a part thereof (for example, the AP 3210). The motor 3298 converts an electrical signal into mechanical vibration. The electronic device 3201 may include a device for supporting mobile TV (for example, a Graphics Processing Unit (GPU)). The device for supporting mobile TV may process media data compliant with, for example, Digital Multimedia Broadcasting (DMB), Digital Video Broadcasting (DVB), or media flow.

Each of the afore-describing components of the electronic device according to various embodiments of the present invention may include one or more components and the names of the components may vary depending on the type of the electronic device. The electronic device according to various embodiments of the present invention may be configured to include at least one of the foregoing components, to further include any other component, or to be without a part of the foregoing components. In addition, some components of the electronic device according to various embodiments of the present invention may be combined into one entity that still performs the functions of the components.

The term "module" as used herein may include its ordinary meaning including, but not limited to, for example, a unit of one, or a combination of two or more, hardware, software or firmware. The term "module" may be used interchangeably with terms such as, for example, unit, logic, logical block, component, or circuit. A module may be the smallest unit for performing one or more functions, or a portion thereof. A module may be implemented mechanically, or electronically. For example, a module according to the present invention may include at least one of a known, or to-be-developed Application-Specific Integrated Circuit (ASIC) chip, Field-Programmable Gate Array (FPGA) or programmable logic device that performs certain operations.

According to various embodiments, at least a part of apparatuses (for example, modules or their functions) or methods (for example, operations) may be implemented as commands stored in a computer-readable storage medium, in the form of a programming module. When a command is executed by one or more processors (for example, the processor 3120), the one or more processors may execute a function corresponding to the command. The computer-readable storage medium may be, for example, the memory 3130. At least a part of the programming module may be implemented (for example, executed) by the processor 3120. At least a part of the programming module may include, for example, a module, a program, a routine, a set of instructions, and/or a process to execute one or more functions.

Examples of the computer-readable recording medium may include Read Only Memory (ROM), Random Access Memory (RAM), optical disk, magnetic tape, floppy disk, hard disk, non-volatile memory, and the like, and may also include the medium that is implemented in the form of carrier waves (for example, transmission over the Internet). In addition, the computer-readable recording medium may be distributed over the computer systems connected over the network, and computer-readable codes may be stored and executed in a distributed manner.

As is apparent from the foregoing description of the content processing method and the electronic device using the same according to various embodiments of the present invention, the electronic device can provide acquired content, for example, an acquired handwriting image.

In the content processing method and the electronic device using the same according to various embodiments of the present invention, since a handwriting included in content acquired by capturing or receiving a written note is stored as vector images, a user can readily edit the handwriting. The vector images can be automatically arranged so that anyone may easily view the handwriting.

In the content processing method and the electronic device using the same according to various embodiments of the present invention, the contents of various notes or memos can be automatically categorized into digital note and stored under the category of digital note.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method of processing content in an electronic device, the method comprising:
    acquiring, by a controller in the electronic device, content including a plurality of characters;
    generating, by the controller, a plurality of editable images using the acquired content;
    grouping the plurality of editable images into a plurality of blocks, based on sizes of the plurality of editable images, intervals between the plurality of editable images, and shapes of the plurality of editable images, wherein each of the plurality of blocks includes a plurality of characters;
    editing, by the controller, the plurality of editable images based on the grouped plurality of editable images; and
    displaying, by the controller, the edited plurality of editable images,
    wherein the editing of the plurality of editable images comprises:
    identifying an interval between at least two adjacent blocks among the plurality of blocks; and
    adjusting the interval between the at least two adjacent blocks based on the identified interval of the at least two adjacent blocks.

2. The method of claim 1, wherein generating the plurality of editable images using the acquired content comprises generating vector images corresponding to the plurality of characters based on the acquired content, and wherein editing the plurality of editable images comprises:
    editing the vector images.

3. The method of claim 2, wherein grouping the plurality of editable images into the plurality of blocks based on the sizes of the plurality of editable images, the intervals between the plurality of editable images, and the shapes of the plurality of editable images comprises:
    determining intervals between the generated vector images and sizes of the generated vector images; and
    comparing shapes of the vector images with a predetermined shape.

4. The method of claim 1, wherein the editing of the plurality of editable images further comprises:
    identifying intervals between the plurality of characters included in each of the plurality of blocks; and
    adjusting the intervals between the plurality of characters included in each of the plurality of blocks based on the identified intervals between the plurality of characters included in each of the plurality of blocks.

5. An electronic device, comprising:
    a display; and
    a controller configured to:
    acquire content including a plurality of characters, generate a plurality of editable images using the acquired content,
    group the plurality of editable images into a plurality of blocks based on sizes of the plurality of editable images, intervals between the plurality of editable images, and shapes of the plurality of editable images,
    edit the plurality of editable images based on the grouped plurality of editable images, and
    display the edited plurality of editable image,
    wherein each of the plurality of blocks includes a plurality of characters,
    wherein the controller further configured to:
    identify an interval between at least two adjacent blocks among the plurality of blocks; and
    adjust the interval between the at least two adjacent blocks based on the identified interval of the at least two adjacent blocks.

6. The electronic device of claim 5, wherein the controller is further configured to control generation of the plurality of editable images using the acquired content by generating vector images corresponding to the plurality of characters based on the acquired content, and control editing of the vector images.

7. The electronic device of claim 6, wherein the controller is configured to control determining intervals between the generated vector images and sizes of the generated vector images, and
    comparing shapes of the vector images within a predetermined shape.

8. The electronic device of claim 6, wherein the controller is further configured to:
    identify intervals between the plurality of characters included in each of the plurality of blocks; and
    adjust the intervals between the plurality of characters included in each of the plurality of blocks based on the identified intervals of the plurality of characters included in each of the plurality of blocks.

9. The method of claim 1, wherein adjusting the intervals between the plurality of characters included in each of the plurality of blocks is executed based on an average interval of the identified intervals between the plurality of characters included in each of the plurality of blocks.

10. The method of claim 1,
    wherein grouping the plurality of editable images into the plurality of blocks comprises:
    identifying pre-stored symbols;
    grouping at least one of the plurality of editable images into at least one block by comparing the identified pre-stored symbols with the plurality of editable images.

11. The method of claim 10, wherein adjusting the intervals of the plurality of characters included in each of the plurality of blocks is executed based on the at least one symbol.

12. The method of claim 1, wherein editing the plurality of editable images comprises:
adjusting sizes of editable images included in each of the plurality of blocks according to types of the plurality of blocks, wherein the types of the plurality of blocks are identified based on shapes of the editable images included in each of the plurality of blocks.

13. The method of claim 12, wherein adjusting the sizes of editable images included in each of the plurality of blocks is executed based on the size of editable images included in each of the plurality of blocks.

14. The electronic device of claim 5, wherein the controller is further configured to:
adjust the intervals between the plurality of characters included in each of the plurality of blocks based on an average interval of the identified intervals between the plurality of characters included in each of the plurality of blocks.

15. The electronic device of claim 5,
wherein the controller is further configured to:
identify pre-stored symbols, and
group at least one of the plurality of editable images into at least one block by comparing the identified pre-stored symbols with the plurality of editable images.

16. The electronic device of claim 5, wherein the controller is further configured to adjust the intervals between the plurality of characters included in each of the plurality of blocks based on the at least one symbol.

17. The electronic device of claim 5, wherein the controller is further configured to:
adjust sizes of editable images included in each of the plurality of blocks according to types of the plurality of blocks, wherein the types of the plurality of blocks are identified based on shapes of the editable images included in each of the plurality of blocks.

18. The electronic device of claim 5, wherein the controller is further configured to:
adjust the sizes of editable images included in each of the plurality of blocks based on the size of editable images included in each of the plurality of blocks.

* * * * *